(12) United States Patent
Saldierna et al.

(10) Patent No.: US 9,453,519 B2
(45) Date of Patent: Sep. 27, 2016

(54) TRANSAXLE

(71) Applicant: Kanzaki Kokyukoki Mfg. Co., Ltd., Hyogo (JP)

(72) Inventors: Oscar H. Saldierna, Morristown, TN (US); Toshifumi Yasuda, Hyogo (JP); Koji Iwaki, Hyogo (JP); Katsumoto Mizukawa, Hyogo (JP); Daisuke Murashima, Hyogo (JP); Masaru Iida, Hyogo (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 326 days.

(21) Appl. No.: 14/179,334

(22) Filed: Feb. 12, 2014

(65) Prior Publication Data

US 2015/0007555 A1    Jan. 8, 2015

Related U.S. Application Data

(60) Provisional application No. 61/843,165, filed on Jul. 5, 2013.

(51) Int. Cl.
| | |
|---|---|
| *F15B 15/02* | (2006.01) |
| *F15B 15/08* | (2006.01) |
| *F16H 61/00* | (2006.01) |
| *F15B 15/26* | (2006.01) |
| *F16H 61/437* | (2010.01) |
| *F16H 63/34* | (2006.01) |
| *F16H 39/06* | (2006.01) |
| *F16H 39/14* | (2006.01) |

(52) U.S. Cl.
CPC ............... *F15B 15/02* (2013.01); *F15B 15/08* (2013.01); *F15B 15/26* (2013.01); *F16H 39/06* (2013.01); *F16H 39/14* (2013.01); *F16H 61/0003* (2013.01); *F16H 61/437* (2013.01); *F16H 63/3425* (2013.01); *B60Y 2200/223* (2013.01); *F16H 2700/02* (2013.01)

(58) Field of Classification Search
CPC ........ F15B 15/02; F15B 15/08; F15B 15/26; F16H 39/06; F16H 39/14; F16H 61/0003; F16H 61/437; F16H 63/3425; F16H 2700/02; B60Y 2200/223

See application file for complete search history.

(56) References Cited

U.S. PATENT DOCUMENTS

| | | | | |
|---|---|---|---|---|
| 4,137,717 | A * | 2/1979 | Forster | F16H 39/42 60/487 |
| 5,709,160 | A * | 1/1998 | Werge-Olsen | F23G 7/001 110/104 B |
| 6,125,630 | A | 10/2000 | Abend et al. | |
| 6,385,971 | B1 | 5/2002 | Abend et al. | |
| 8,276,705 | B2 * | 10/2012 | Sumiyoshi | B60T 1/062 180/306 |
| 2010/0108460 | A1 * | 5/2010 | Nakamura | F16H 63/3416 192/219.5 |

* cited by examiner

*Primary Examiner* — Logan Kraft
(74) *Attorney, Agent, or Firm* — Sterne, Kessler, Goldstein & Fox P.L.L.C.

(57) ABSTRACT

A transaxle includes a hydrostatic transmission and an axle driven by the hydrostatic transmission. The hydrostatic transmission includes a hydraulic pump and a hydraulic motor fluidly connected to each other. The hydraulic pump has a pump shaft. The hydraulic motor has a motor shaft drivingly connected to the axle. The motor shaft has an axis extended slantwise from an axis of the pump shaft. The transaxle further includes a gear train for transmitting power from the motor shaft to the axle, and a gear locking system having a locking pawl. A gear of the gear train is adapted to engage with the locking pawl.

8 Claims, 32 Drawing Sheets

TRANSAXLE

CROSS-REFERENCE TO RELATED APPLICATIONS

The present application claims the benefit of U.S. Provisional Application No. 61/843,165, entitled, "Transaxle", and filed Jul. 5, 2013, the entirety of which is hereby incorporated by reference.

BACKGROUND OF THE INVENTION

1. Field of the Invention

The present invention relates to a transaxle including a hydrostatic transmission (hereinafter, "HST") and an axle driven by the HST. Especially, the transaxle serves as one of right and left transaxles carrying respective right and left individual axles for driving a zero-turn vehicle, e.g., a lawn mower.

2. Related Art

As disclosed by U.S. Pat. No. 6,125,630 A (hereinafter, '630), there is a well-known conventional hydraulic transaxle serving as one of right and left transaxles carrying respective right and left individual axles for driving a zero-turn vehicle, e.g., a lawn mower. The transaxle includes an HST, an axle, and a reduction gear train for transmitting power from the HST to the axle. The transaxle includes a transaxle casing incorporating the HST and the reduction gear train and supporting the axle. The HST includes a hydraulic pump for receiving power from a prime mover, a hydraulic motor for outputting power to the reduction train, and a center section on which the hydraulic pump and the hydraulic motor are mounted to be fluidly connected to each other via a hydraulic fluid circuit formed in the center section.

'630 discloses some transaxles adaptable as one of right and left transaxles for a zero-turn vehicle. One transaxle disclosed by '630 (see FIG. 5) includes an HST configured so that the hydraulic pump has a vertical pump shaft, and the hydraulic motor has a horizontal motor shaft extended parallel to the horizontal axle. All gears of the reduction gear train drivingly connecting the motor shaft to the axle are spur gears. The transaxle is provided with a brake system including a brake disc, a brake camshaft, and a brake shoe. The brake disc is disposed vertically on the motor shaft, and the brake camshaft is extended vertically adjacent to the brake disc. By rotating a brake operation arm fixed on the brake camshaft, the brake camshaft is rotated to press the brake shoe against the brake disc, thereby braking the motor shaft, the reduction gear train, and the axle. This transaxle having the horizontal motor shaft parallel to the axle expands in the axial direction of the axle and increases the lateral dimension of its transaxle casing, thereby being an obstacle to facilities for mounting this transaxle on a vehicle.

Another transaxle disclosed by '630 (see FIGS. 21 and 22) includes an HST having a horizontal motor shaft extended perpendicular to the axle. Bevel gears are used to drivingly connect the motor shaft to the axle. This transaxle is advantageous to reduce the lateral dimension of its transaxle casing. However, the transaxle casing has a great fore-and-aft dimension so that the pump shaft becomes distant from the axle, thereby also being an obstacle to facilities for mounting this transaxle on a vehicle.

Further, the transaxle needs a compact brake system that can efficiently brake the motor shaft, the reduction gear train, or the axle.

SUMMARY OF THE INVENTION

An object of the present invention is to provide a transaxle that includes an HST and an axle driven by the HST, wherein the HST is improved to ensure the compactness of the transaxle.

To achieve the object, a transaxle according to the present invention includes a transaxle casing, an HST, and an axle driven by the HST. The HST and the axle are disposed in the transaxle casing. The HST includes a hydraulic pump and a hydraulic motor fluidly connected to each other. The hydraulic pump has a pump shaft extended perpendicular to the axle, and the hydraulic motor has a motor shaft drivingly connected to the axle. The hydraulic motor is disposed between the hydraulic pump and the axle. The motor shaft has an axis extended slantwise from an axis of the pump shaft. Therefore, the hydraulic motor having the slant motor shaft is advantageous to minimize the transaxle. For example, if the axis of the pump shaft is vertical and the axis of the motor shaft is vertically slant, the hydraulic motor having the vertically slant motor shaft is advantageous to minimize the horizontal dimension of the transaxle in the axial direction of the motor shaft when viewed in plan.

Preferably, the transaxle further includes a gear train for transmitting power from the motor shaft to the axle, and further includes a gear locking system having a locking pawl. A gear of the gear train is adapted to engage with the locking pawl. Therefore, the engagement of the gear with the locking pawl ensures efficient braking of the gear train even if the gear locking system is compact in comparison with the conventional brake system having the brake shoe pressed against the brake disc.

Preferably, the gear train includes a bevel pinion fixed on the motor shaft, and includes a bevel gear meshing with the bevel pinion. Therefore, the bevel pinion and the bevel gear meshing with each other ensure power transmission from the slant motor shaft to the horizontal axle.

Preferably, the bevel pinion serves as the gear adapted to engage with the locking pawl. Therefore, a small diametric dimension of the bevel pinion is advantageous so that recesses among gear teeth of the bevel pinion can be directly used as portions for the engagement with the pawl, thereby dispensing additional processing of the bevel pinion to provide a portion to engage with the locking pawl and thereby dispensing substantive or expensive expansion or strengthening of the locking pawl for surely stopping the bevel pinion on its engaging with the bevel pinion. On the contrary, the bevel gear meshing with the bevel pinion needs to have a large diametric dimension, so that, if the bevel gear served as the gear adapted to engage with the locking pawl, the locking pawl would have to be expanded or strengthened to surely stop the bevel gear or the bevel gear would have to be additionally processed to provide a portion facilitating the engagement with the locking pawl. Further, the small-sized locking pawl adapted to engage with the bevel pinion can be disposed in a small dead space caused by the slant arrangement of the hydraulic motor with the slant motor shaft, thereby ensuring the required compactness of the transaxle.

Preferably, the axes of the pump shaft and the motor shaft have an acute angle therebetween. Therefore, on an assumption that the motor shaft has proximal and distal ends so that the proximal end is closer to the pump shaft than the distal end, the transaxle is prevented from expanding in the direction from the pump shaft to the distal end of the motor shaft, thereby ensuring the required compactness of the transaxle. For example, if the pump shaft is vertical, the angle between the vertical axis of the pump shaft and the vertically slant axis of the motor shaft is acute so as to minimize the transaxle in the horizontal direction from the pump shaft to the distal end of the motor shaft.

Further preferably, the HST includes a center section having a pump mounting surface and a motor mounting surface. The center section is detachably attached to the transaxle casing. Respective ports are open at the pump mounting surface and the motor mounting surface so that the hydraulic pump mounted on the pump mounting surface and the hydraulic motor mounted on the motor mounting surface are fluidly connected to each other via the ports. The pump mounting surface and the motor mounting surface have an obtuse angle therebetween. Such an obtuse angle arrangement of the pump mounting surface and the motor mounting surface ensures the acute angle arrangement of the pump shaft and the motor shaft, thereby minimizing the transaxle.

These, further and other objects, features and advantages will appear more fully from the following detailed description of the invention with reference to the attached drawings.

DETAILED DESCRIPTION OF THE INVENTION

Figure 1:
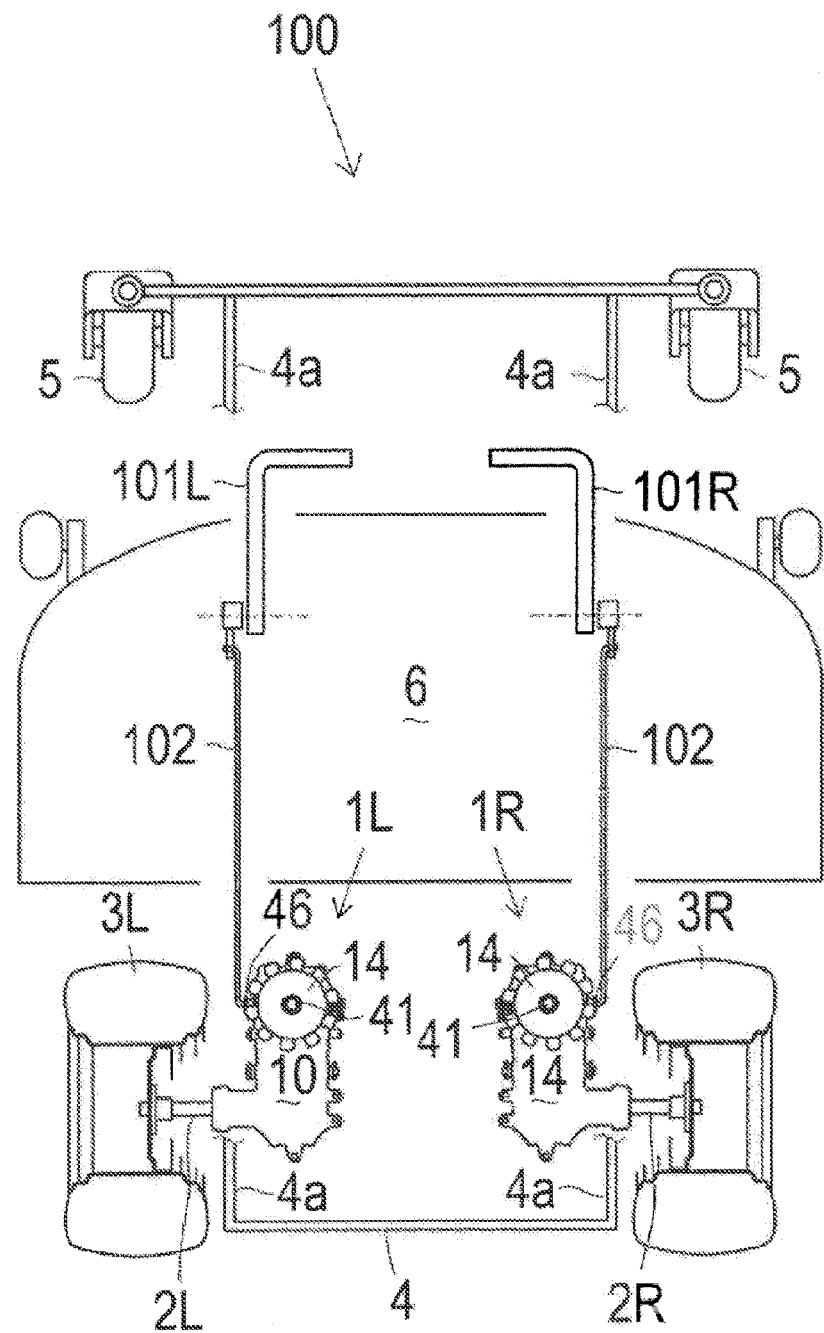
FIG. 1 is a schematic plan view of a lawn mower 100 serving as a zero-turn vehicle equipped with right and left transaxles 1R and 1L and with right and left control levers 101R and 101L for controlling respective transaxles 1R and 1L.
Figure 2:
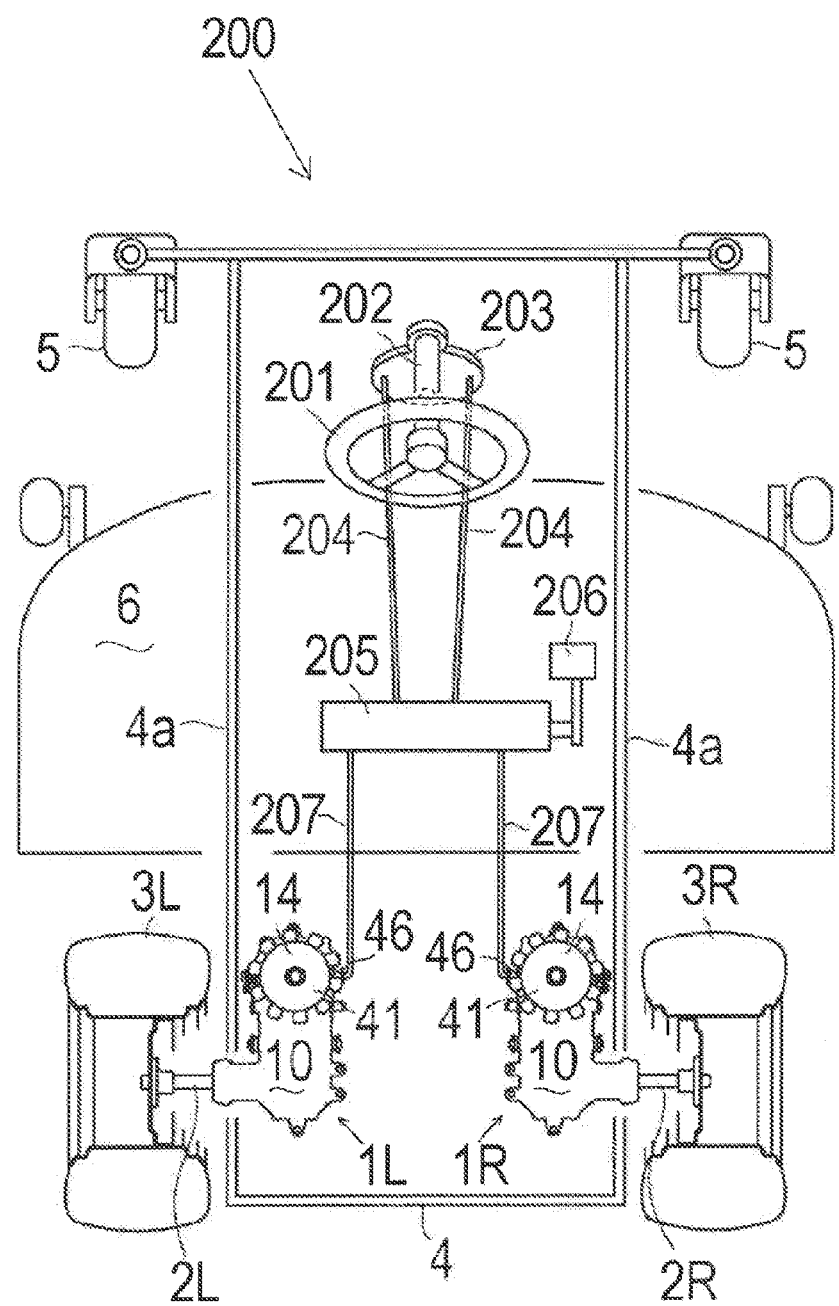
FIG. 2 is a schematic plan view of a lawn mower 200 serving as a zero-turn vehicle equipped with right and left transaxles 1R and 1L and with a steering wheel 201 and a speed control pedal 206 for controlling right and left transaxles 1R and 1L.

Referring to FIGS. 1 and 2, each of lawn mowers (hereinafter simply referred to as "vehicles") 100 and 200 serving as typical zero-turn vehicles is equipped with right and left transaxle 1R and 1L carrying respective right and left axles 2R and 2L. Each of vehicles 100 and 200 includes a vehicle body frame 4 having right and left parallel sideboards 4a extended in the fore-and-aft horizontal direction thereof. Vehicle body frame 4 supports right and left transaxles 1R and 1L so that transaxle casings 10 of right and left transaxles 1R and 1L are disposed in the inside of vehicle body frame 4, i.e., between right and left sideboards 4a when viewed in plan. Right axle 2R is extended rightward from transaxle casing 10 of right transaxle 1R to the outside of right sideboard 4a of vehicle body frame 4 so as to be fixed at a distal end thereof to right drive wheel 3R. Left axle 2L is extended leftward from transaxle casing 10 of left transaxle 1L to the outside of left sideboard 4a of vehicle body frame 4 so as to be fixed at a distal end thereof to left drive wheel 3L.

Right and left drive wheels 3R and 3L serve as rear wheels of each of vehicles 100 and 200 so as to be disposed on the right and left outsides of a rear portion of vehicle body frame 4. A front end portion of vehicle body frame 4 supports castors (or castor) 5 serving as front wheels (or a front wheel) of vehicle 100 or 200. A mower unit 6 is disposed below a fore-and-aft middle portion of vehicle body frame 4 between front wheels 5 and rear wheels 3R and 3L. Further, each of vehicles 100 and 200 is equipped with an unshown prime mover such as an engine whose output power is transmitted via an unshown belt or the like to input pulleys 14 of respective right and left transaxles 1R and 1L.

Referring to FIG. 1, vehicle 100 is provided with right and left control levers 101R and 101L. Link rods 102 are extended rearward from respective right and left control levers 101R and 101L to respective transaxle casings 10 of right and left transaxles 1R and 1L. Therefore, right and left link rods 102 extended from respective control levers 101R and 101L are disposed along respective right and left sideboards 4a of vehicle body frame 4. When viewed in plan, right and left link rods 102 are extended in the fore-and-aft direction along respective right and left sideboards 4a. As discussed later, transaxle casing 10 of each of right and left transaxles 1R and 1L can be selectively provided with HST control arm 46 on either the right or left proximal side surface thereof or the right or left distal side surface thereof. Therefore, in the present embodiment, transaxles 1R and 1L in vehicle 100 are provided with respective HST control arms 46 on the distal side surfaces of respective transaxle casings 10 thereof because right and left link rods 102 are rather close to the distal sides of vehicle 100. Further, a later-discussed neutral return spring 47 is provided on the right or left side surface of transaxle casing 10 of each of right and left transaxles 1R and 1L opposite HST control arm 46. Therefore, whether neutral returning spring 47 is provided on the proximal or distal side surface of transaxle casing 10 depends on whether HST control arm 46 is provided on the proximal or distal side surface of transaxle casing 10.

Right control lever 101R is operable to change the tilt angle and direction of a later-discussed movable swash plate 44 of an HST 20 of right transaxle 1R so as to change the rotary speed and direction of right rear wheel 3R. Left control lever 101L is operable to change the tilt angle and direction of movable swash plate 44 of HST 20 of left transaxle 1L so as to change the rotary speed and direction of left rear wheel 3L. When right and left control levers 101R and 101L are synchronously manipulated, movable swash plates 44 of HSTs 20 of right and left transaxles 1R and 1L are synchronously controlled to change the straight travel speed or direction of vehicle 100. When right and left control levers 101R and 101L are independently manipulated, movable swash plates 44 of HSTs 20 of right and left transaxles 1R and 1L are differentially controlled so as to control the turn direction, angle, and speed of vehicle 100.

Alternatively, referring to FIG. 2, vehicle 200 is provided with a steering wheel 201 that is connected to a sector gear 203 via a stem 202. Right and left link rods 204 are extended from sector gear 203 to a zero-turn control unit 205, and right and left rods 207 are extended from zero-turn control unit 205 to respective transaxle casings 10 of right and left transaxles 1R and 1L. A speed control pedal 206 is operatively connected to zero-turn control unit 205. Due to the depression of speed control pedal 206, right and left link rods 207 are pulled or pushed synchronously in the same direction and to the same degree to rotate respective HST control arms 46, thereby controlling the travel speed of vehicle 200 in either the forward or backward direction. Due to the rotation of steering wheel 201, right and left link rods 207 are independently pushed or pulled so as to differentially rotate right and left HST control arms 46, thereby turning vehicle 200. Typical zero-turn control unit 205 is configured as disclosed by U.S. Pat. No. 4,875,536 A, for example.

In this regard, zero-turn control unit 205 is disposed at the lateral middle portion of vehicle 200 between right and left sideboards 4a of vehicle body frame 4 so that right and left link rods 207 extended from zero-turn control unit 205 are disposed inward from respective right and left sideboards 4a so as to be rather distantly inward from respective right and left sideboards 4a. Therefore, transaxles 1R and 1L in vehicle 200 are provided with respective HST control arms 46 on the proximal side surfaces of respective transaxle casings 10 thereof.

In each of vehicles 100 and 200, right and left transaxles 1R and 1L are arranged to have respective axles 2R and 2L being coaxial to each other. Incidentally, right and left transaxles 1R and 1L are arranged so that later-discussed HSTs 20 operatively connected to respective HST control arms 46 are disposed in respective front portions of transaxle casings 10 of transaxles 1R and 1L and so that axles 2R and 2L are supported by respective rear portions of transaxle casings 10 of transaxles 1R and 1L rearward from HSTs 20. Alternatively, either or both of transaxles 1R and 1L may be disposed to have HST 20 rearward from axle 2R or 2L.

Referring to FIGS. 3 to 20, a transaxle 1 carrying an axle 2 will be described on the assumption that it represents right transaxle 1R carrying right axle 2R and left transaxle 1L carrying left axle 2L such as those of zero-turn vehicle 100 or 200. Transaxle 1 includes a transaxle casing 10, an HST 20 disposed in a front portion of transaxle casing 10, an axle 2 (serving as either right axle 2R or left axle 2L of vehicle 100 or 200) journalled by a rear portion of transaxle casing 10, and a reduction gear train 70 disposed in the rear portion of transaxle casing 10 so as to drivingly connect HST 20 to axle 2.

Transaxle casing 10 includes a transaxle housing 11, a lower cover 12 made of a metal plate, and a top cover 13. Transaxle housing 11 serving as a main body of transaxle casing 10 is entirely formed by casting. A downwardly open chamber 10a is formed in transaxle housing 11 so as to extend from a front end of transaxle housing 11 to a rear end of transaxle housing 11. HST 20 is disposed in a front half portion of chamber 10a in transaxle housing 11, and reduction gear train 70 is disposed in a rear half portion of chamber 10a in transaxle housing 11.

Transaxle housing 11 is formed with bosses 11a, 11m, and 11n having respective vertical through holes through which respective bolts are passed to fasten transaxle housing 11 to vehicle body frame 4 of vehicle 100 or 200. Front and rear bosses 11a are formed on front and rear ends of transaxle housing 11. A substantially laterally symmetric main body of transaxle housing 11 is formed by casting with a main mold (not shown), and an axle support portion 11i of transaxle housing 11 for journaling axle 2 is formed by casting with a sub mold (not shown) combined with the main mold so as to be joined to the main body of transaxle housing 11. Whether the sub mold is disposed rightward or leftward of the main mold can be selected so that axle support portion 11i can be selectively formed on either the right rear portion of the main body or the left rear portion of the main body. In this regard, transaxle 1 illustrated in FIGS. 3 to 13 serves as right transaxle 1R carrying right axle 2R so that axle support portion 11i extends rightward to support right axle 2R as drawn in solid lines in FIGS. 3 and 4 and others. Alternatively, transaxle housing 11 may have axle support portion 11i extended leftward to support left axle 2L as drawn in phantom lines in FIGS. 3 and 4 and others so as to constitute left transaxle 1L carrying left axle 2L. Whether axle support portion 11i extends rightward or leftward, front and rear bosses 11n are formed on axle support portion 11i, and front and rear bosses 11m are formed on a right or left side of transaxle housing 11 opposite axle support portion 11i in the lateral direction.

Lower cover 12 is fastened by bolts 16 to a bottom edge of transaxle housing 11 so as to cover the bottom opening of chamber 10a in transaxle housing 11 surrounded by the bottom edge of transaxle housing 11. A ceiling wall of transaxle housing 11 has a top opening 11g in a rear top portion thereof defining the rear half portion of chamber 10a incorporating reduction gear train 70. Top cover 13 is fastened by bolts 17 to the edge portion of transaxle housing 11 surrounding top opening 11g so as to cover an upper portion of reduction gear train 70 in transaxle housing 11.

HST 20 includes a center section 30, a hydraulic pump 40, and a hydraulic motor 50. Referring to FIGS. 15 to 20, center section 30 is entirely formed by casting so as to have a horizontal discoid pump port block 31, an upwardly slant discoid motor port block 32, a bypass valve block 33, and a plurality (in this embodiment, four) of bolt bosses 34 and 35. Center section 30 will be described on the assumption that motor port block 32 is joined to pump port block 31 so as to extend rearwardly upward from a rear end of pump port block 31.

As shown in FIGS. 15, 16, 19, and 20, pump port block 31 is formed therein with right and left pump kidney ports 31b and 31c and a pump shaft hole 31d between pump kidney ports 31b and 31c. A horizontal pump mounting surface 31a is formed on a top end of pump port block 31. Pump kidney ports 31b and 31c and pump shaft hole 31d are extended vertically upward so as to be open at horizontal pump mounting surface 31a.

Figure 17:
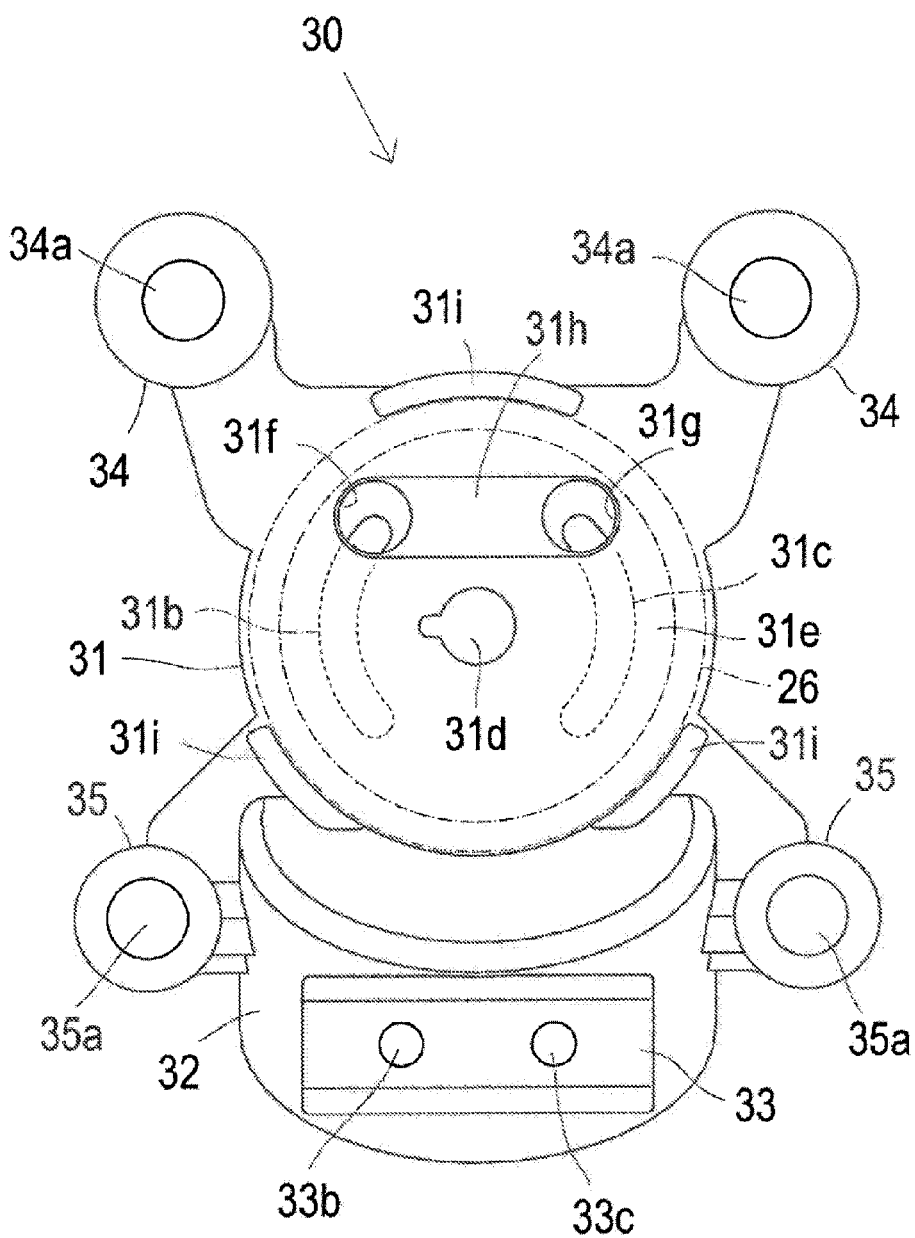
FIG. 17 is a bottom view of center section 30.
Figure 18:
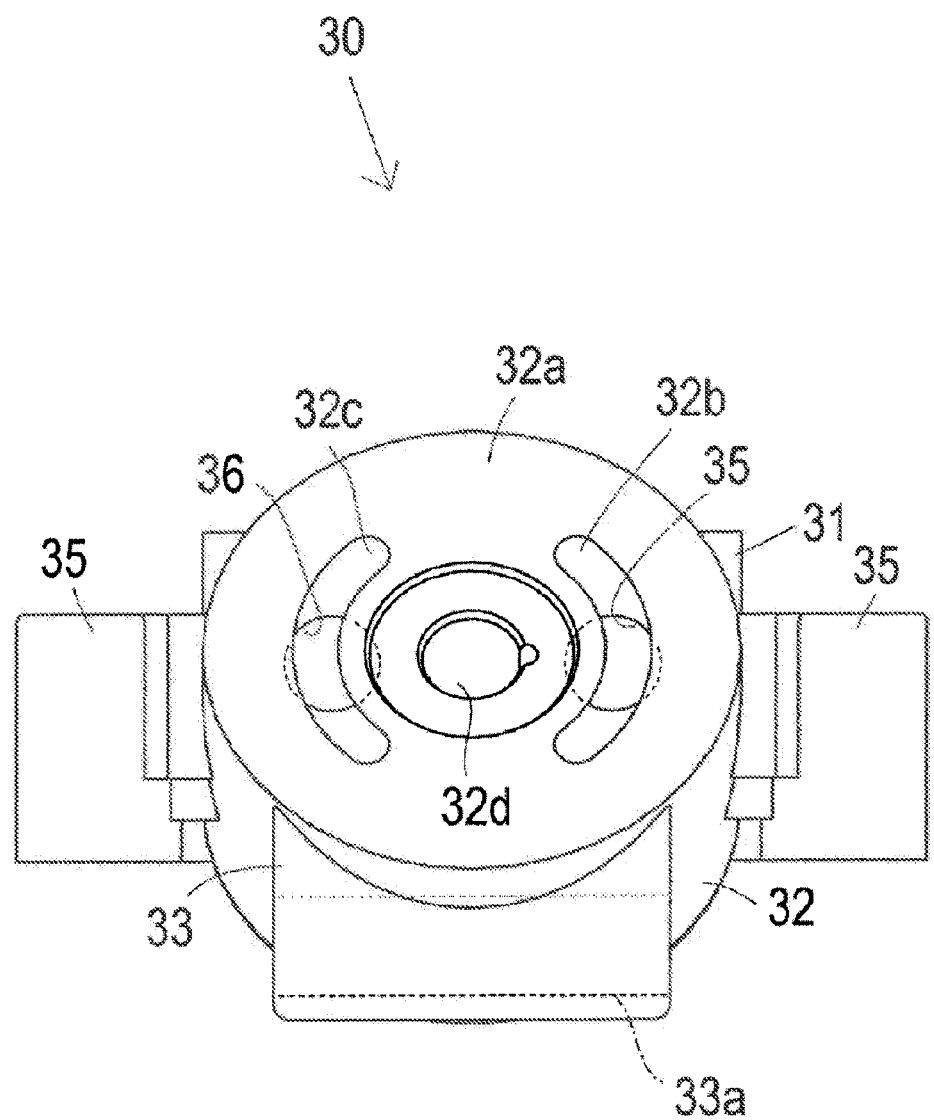
FIG. 18 is a rear view of center section 30.

As shown in FIG. 17 and others, a horizontal filter mounting surface 31e is formed on a bottom end of pump port block 31. A circumferential area of filter mounting surface 31e is provided to contact a top edge of a cylindrical filter 26 (see FIG. 6 and others). Plural (in this embodiment, three) filter retainers 31i project downward from filter mounting surface 31e and are formed and aligned along the circumferential area of filter mounting surface 31e so as to fit an upper portion of a peripheral side surface of filter 26 whose top edge contacts the circumferential area of filter mounting surface 31e. Pump shaft hole 31d is extended vertically downward so as to be open at a central portion of filter mounting surface 31e. A charge port gallery 31h is open at a front portion of filter mounting surface 31e between pump shaft hole 31d and the circumferential area of filter mounting surface 31e. Right and left charge ports 31f and 31g are open at respective bottom ends thereof to charge port gallery 31h.

In this regard, when HST 20 is disposed in transaxle casing 10, filter 26 contacting filter mounting surface 31e of center section 30 is submerged in a fluid sump in chamber 10a so that fluid is filtered by filter 26 when the fluid penetrates filter 26 from the fluid sump in chamber 10a to the inside space of filter 26. The fluid in the inside of filter 26 constantly enters charge port gallery 31h and charge ports 31f and 31g.

Figure 19:
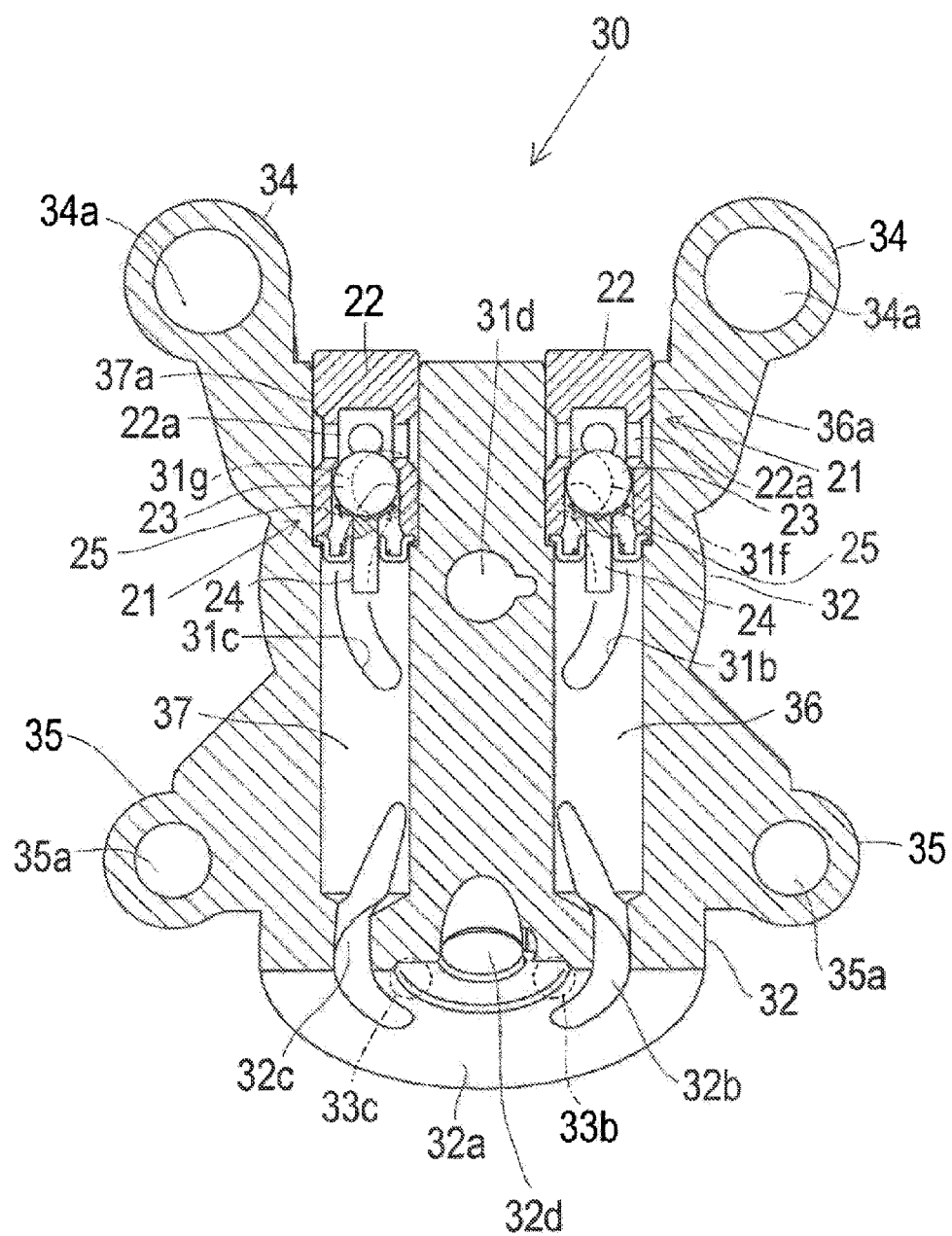
FIG. 19 is a sectional plan view of center section 30.
Figure 20:
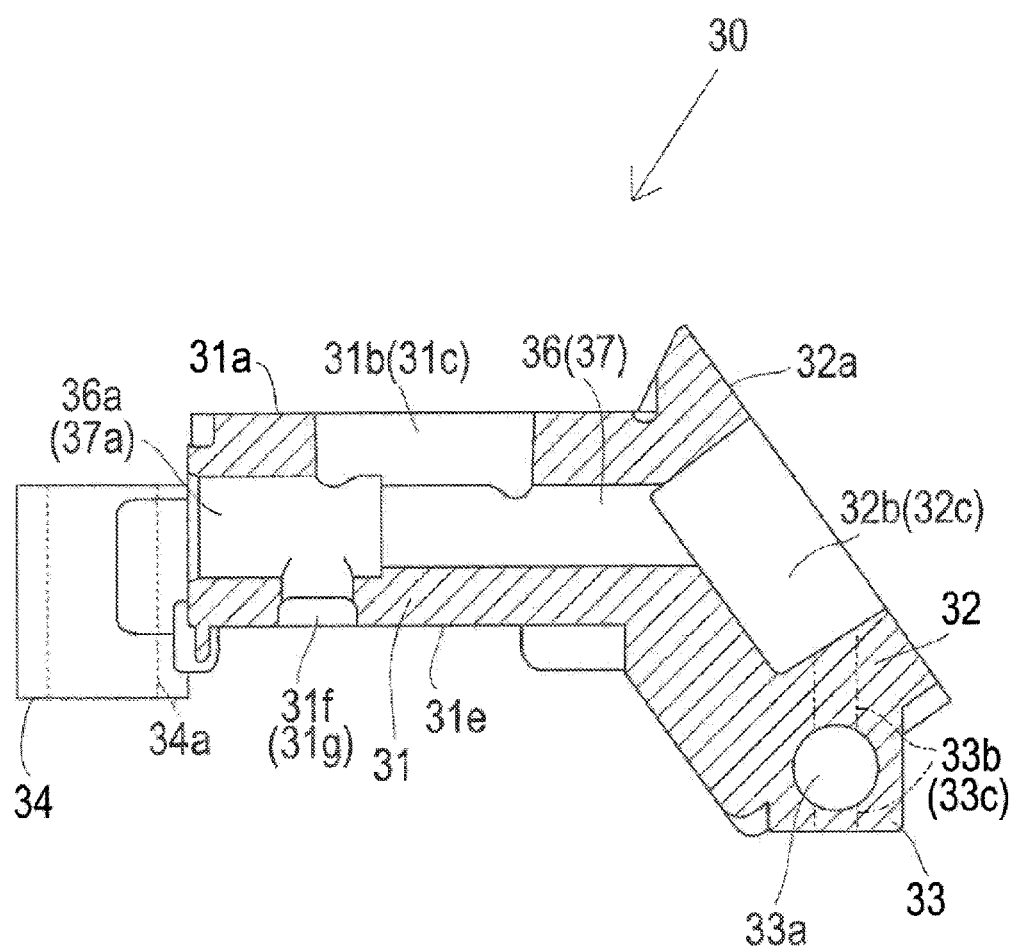
FIG. 20 is a sectional side view of center section 30.

As shown in FIGS. 19, 20, and others, right and left main fluid passages 36 and 37 are formed in pump port block 31 so as to extend in the horizontal fore-and-aft direction. Front portions of main fluid passages 36 and 37 are diametrically expanded to serve as charge valve chambers 36a and 37a that are open outward at the front end of pump port block 31. Right kidney port 31b is joined at a bottom thereof to a top portion of right main fluid passage 36 and right charge port 31f is joined at a top thereof to a bottom portion of right charge valve chamber 36a. Similarly, left kidney port 31c is joined to left main fluid passage 37, and left charge port 31g is joined to left charge valve chamber 37a.

As shown in FIG. 19, right and left charge check valves 21 are disposed in respective right and left charge valve chambers 36a and 37a. Each charge check valve 21 includes a valve casing 22, a ball valve member 23, a pressure pin 24, and a spring 25. Valve casing 22 is fitted in each of charge valve chambers 36a and 37a so as to serve as a plug closing the outward opening of each of charge valve chambers 36a and 37a. Valve casing 22 is formed therein with a valve port 22a that is constantly open to each of charge ports 31f and 31g. Ball valve member 23 is biased by spring 25 so as to block valve port 22a from each of fluid passages 36 and 37. Charge check valve 21 is configured so that when either main fluid passage 36 or 37 is hydraulically depressed and the hydraulic pressure therein is lower than that in valve port 22a, the differential pressure of fluid between valve port 22a and hydraulically depressed main fluid passage 36 or 37 thrusts ball valve member 23 against spring 25 so as to open valve port 22a to hydraulically depressed main fluid passage 36 or 37, thereby supplying fluid passed through filter 26 to main fluid passage 36 or 37.

Motor port block 32 is formed therein with right and left motor kidney ports 32b and 32c and a motor shaft hole 32d between motor kidney ports 32b and 32c. A slant upper end of motor port block 32 is formed as a rearwardly downward slant motor mounting surface 32a. Right and left motor kidney ports 32b and 32c and motor shaft hole 32d are extended rearwardly upward so as to be open at motor mounting surface 32a. Right and left main fluid passages 36 and 37 are extended rearward into motor port block 32 so as to be joined at rear ends thereof to respective right and left motor kidney ports 32b and 32c.

Bypass valve block 33 projects downward from motor port block 32 so as to extend in the lateral horizontal portion. A lateral horizontal bypass valve hole 33a is formed through bypass valve block 33. Right and left ends of bypass valve holes 33a are open outward at right and left vertical end surfaces of bypass valve block 33. Right and left vertical bypass ports 33b and 33c are extended downward from respective right and left motor kidney ports 32b and 32c so as to cross bypass valve hole 33a and are further extended downward from bypass valve hole 33a so as to be open outward at a horizontal bottom surface of bypass valve block 33.

Figure 9:
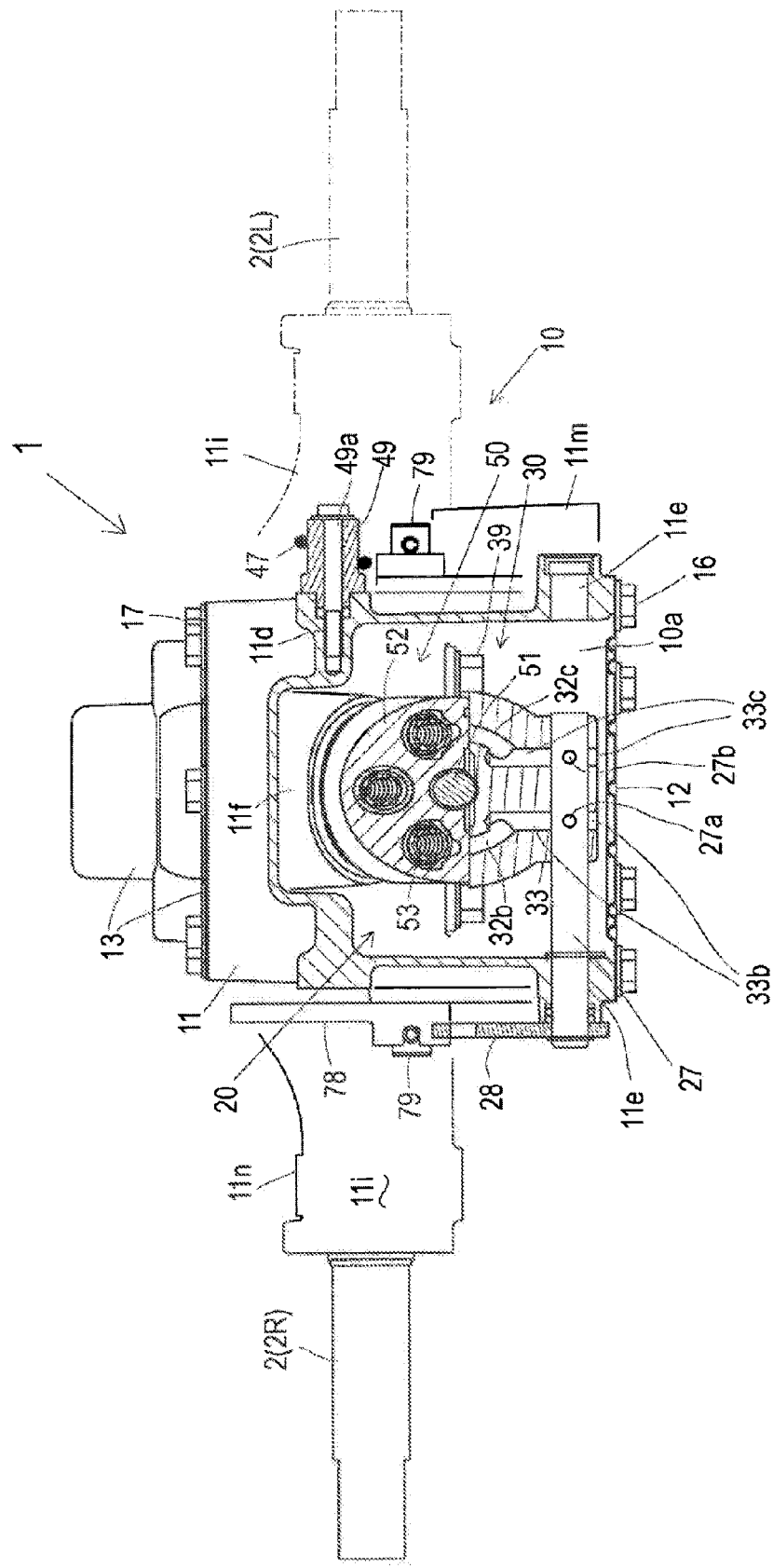
FIG. 9 is a cross sectional front view of transaxle 1 taken along C-C arrows of FIG. 3.

In this regard, as shown in FIG. 9, a rotary bypass valve 27 having right and left diametric valve passages 27a and 27b is fitted in bypass valve hole 33a. Bypass valve 27 is rotatably centered on its laterally horizontal axis so as to be shiftable between a valve closing position and a valve opening position. To release fluid from main fluid passages 36 and 37 to the fluid sump in chamber 10a, bypass valve 27 is disposed at the valve opening position so as to orient valve passages 27a and 27b vertically to fluidly connect the upper portions of bypass ports 33b and 33c above bypass valve hole 33a to the lower portions of bypass ports 33b and 33c below bypass valve hole 33a via respective bypass passages 27a and 27b, thereby releasing fluid from motor kidney ports 32b and 32c to the fluid sump in chamber 10a via the open bottom ends of bypass ports 33b and 33c. Bypass valve 27 is normally disposed at the valve closing position so that valve passages 27a and 27b deviate from respective bypass ports 33b and 33c, thereby blocking bypass ports 33b and 33c. Bypass valve 27 can be selectively inserted into bypass valve hole 33a from either the right or left vertical end surface of bypass valve block 33.

Figure 10:
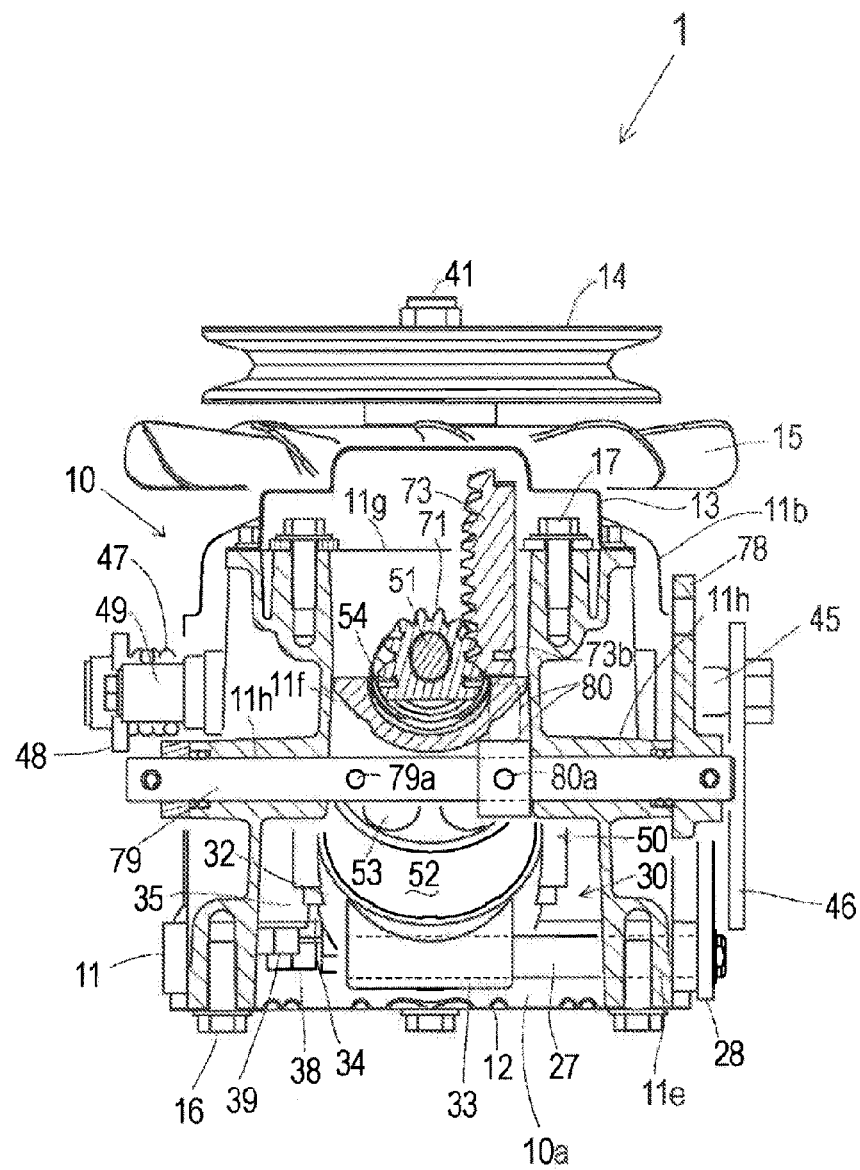
FIG. 10 is a cross sectional rear view of transaxle 1 taken along D-D arrows of FIG. 3.

Right and left front bosses 34 having respective vertical through holes 34a are expanded rightwardly and leftwardly forward from pump port block 31. Right and left rear bosses 35 having respective vertical through holes 35a are expanded rightward and leftward from motor port block 32. Referring to FIG. 10, bolts 38 are passed upward through respective vertical through holes 34a in right and left front bosses 34 and are screwed upward into transaxle housing 11, and bolts 39 are passed upward through respective vertical through holes 35a in right and left rear bosses 35 and are screwed upward into transaxle housing 11, thereby fastening center section 30 with four-pointed bosses 34 and 35 to transaxle housing 11.

Center section 30, configured as mentioned above, is advantageous in its lateral symmetry. In this regard, for example, right and left main fluid passages 36 and 37, right and left charge ports 31f and 31g, right kidney ports 31b and 32b, and left kidney ports 31c and 32c, right and left charge check valve chambers 36a and 37a, and right and left bypass ports 33b and 33c are laterally symmetric so that hydraulic pump 40 and hydraulic motor 50 mounted on center section 30 are aligned in the fore-and-aft direction of transaxle 1 without lateral eccentricity or deviation. Charge check valves 121 are also laterally symmetrically arranged. Such a lateral symmetry of center section 30 is advantageous to standardize transaxle 1 serving as either of right and left transaxles 1R and 1L.

Referring to FIGS. 6 to 9, hydraulic pump 40 includes a pump shaft 41, a pump cylinder block 42, plungers 43, and a movable swash plate 44. Pump shaft 41 is fittingly passed through pump shaft hole 31d of center section 30 rotatably relative to center section 30. Pump cylinder block 42 is formed with a center through hole serving as a pump shaft hole 42a and with cylinder bores 42b aligned radially around pump shaft hole 42a. Pump shaft 41 is fittingly passed through pump shaft hole 42a unrotatably relative to pump cylinder block 42. Pump cylinder block 42 is slidably rotatably fitted onto pump mounting surface 31a so as to fluidly connect cylinder bores 42b therein to pump kidney ports 31b and 31c. Plungers 43 are fitted into respective cylinder bores 42b reciprocally in the axial direction of pump shaft 41, thereby constituting axial piston type hydraulic pump 40. Movable swash plate 44 has a bearing 44a abutting against heads of plungers 43 projecting from pump cylinder block 42.

Figure 7:
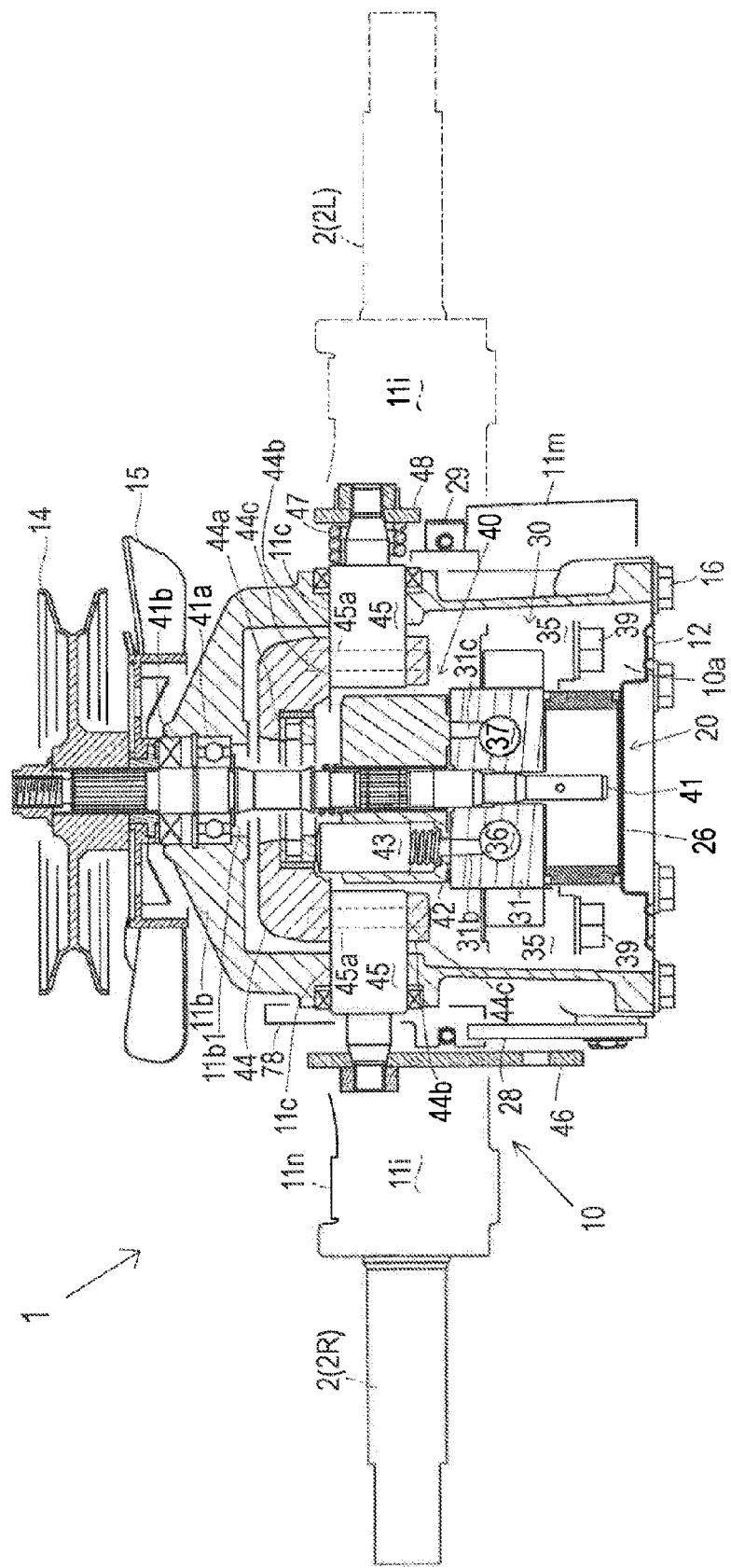
FIG. 7 is a cross sectional front view of transaxle 1 taken along B-B arrows of FIG. 3.
Figure 8:
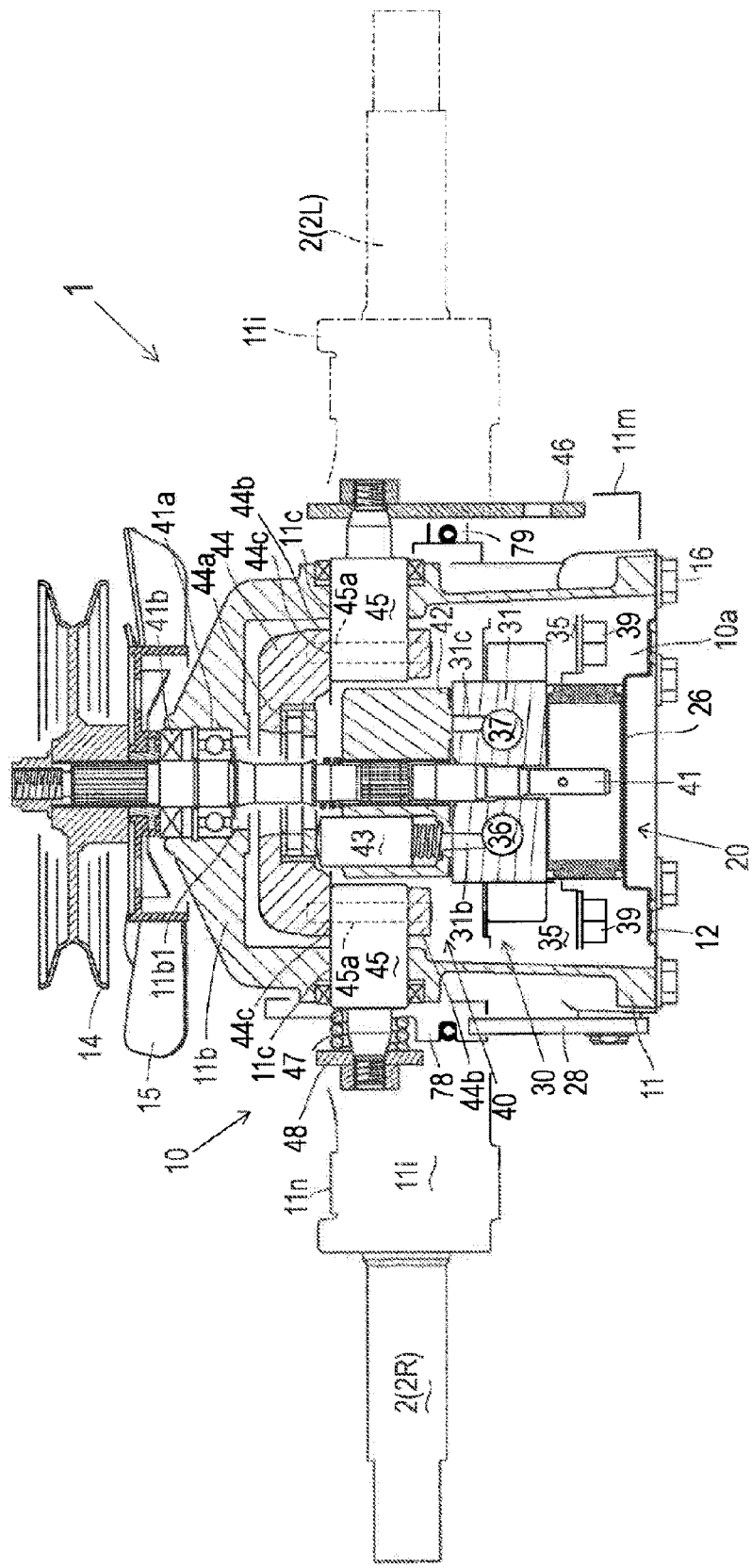
FIG. 8 is the same cross sectional front view of transaxle 1 as FIG. 7 except for an alternative arrangement of a hydrostatic stepless transmission (hereinafter referred to as HST) control arm 46 and a neutral return spring 47.

A front top portion of the ceiling wall of transaxle housing 11 is formed as a pump support portion 11b. Referring to FIG. 7, movable swash plate 44 of hydraulic pump 40 is fitted to a ceiling surface of pump support portion 11b slidably rotatably relative to transaxle housing 11. Transaxle housing 11 is formed through right and left side walls of pump support portion 11b with right and left symmetric trunnion holes 11c. Movable swash plate 44 is formed with right and left symmetric feet 44b having respective right and left symmetric trunnion holes 44c. While movable swash plate 44 is fitted to pump support portion 11b, right and left trunnions 45 are fittingly passed through respective right and left trunnion holes 44c of movable swash plate 44 and respective right and left trunnion holes 11c of transaxle housing 11 so as to project at respective distal end portions thereof rightwardly and leftwardly outward from right and left side walls of transaxle housing 11. Right and left fixture pins 45a fasten right and left feet 44b of movable swash plate 44 to fix right and left trunnions 45 fitted in trunnion holes 44c.

Pump support portion 11b is formed with a vertical through hole 11b1. An upper portion of pump shaft 41 projecting upward from pump cylinder block 42 fitted on pump mounting surface 31a of center section 30 is freely passed through movable swash plate 44 fitted to pump support portion 11b and through vertical through hole 11b1 of pump support portion 11b so as to project upward from pump support portion 11b of transaxle housing 11. A bearing 41a and a fluid seal 41b are fitted in through hole 11b1 of pump support portion 11b so as to be interposed between pump shaft 41 and pump support portion 11b of transaxle housing 11. An input pulley 14 and a cooling fan 15 are fixed on the upper portion of pump shaft 41 projecting upward from pump support portion 11b of transaxle housing 11. Vehicle 100 or 200 is equipped with an unshown prime mover such as an engine whose output power is transmitted to input pulley 14 via a belt and so on.

Figure 6:
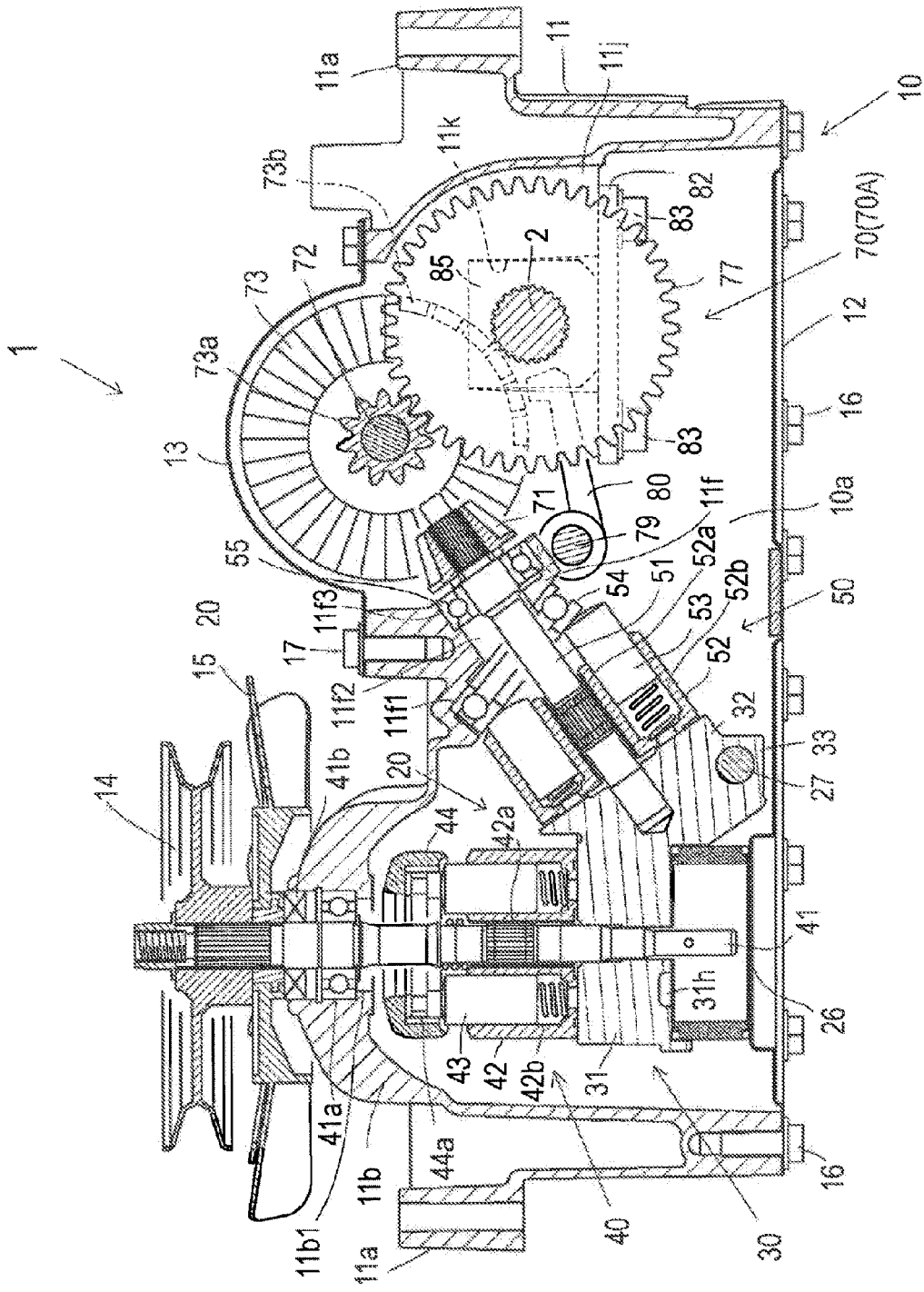
FIG. 6 is a cross sectional side view of transaxle 1 taken along A-A arrows of FIG. 3.

Referring to FIGS. 6 and 9, hydraulic motor 50 includes a motor shaft 51, a motor cylinder block 52, plungers 53, and a fixed swash plate 54. Motor shaft 51 is fitted into motor shaft hole 32d of center section 30 rotatably relative to center section 30. Motor cylinder block 52 is formed with a center through hole serving as a motor shaft hole 52a and with cylinder bores 52b aligned radially around motor shaft hole 52a. Motor shaft 51 is fittingly passed through motor shaft hole 52a unrotatably relative to motor cylinder block 52. Motor cylinder block 52 is slidably rotatably fitted onto motor mounting surface 32a of center section 30 so as to fluidly connect cylinder bores 52b therein to motor kidney ports 32b and 32c. Plungers 53 are fitted into respective cylinder bores 52b reciprocally in the axial direction of motor shaft 51, thereby constituting axial piston type hydraulic motor 50. A bearing abuts against heads of plungers 53 projecting from motor cylinder block 52 so as to serve as fixed swash plate 54.

Referring to FIG. 6, an inner surface of the ceiling wall of transaxle housing 11 at the fore-and-aft middle portion thereof between pump support portion 11b and top opening 11g is formed to protrude rearwardly downward slantwise so as to face upward slant motor port block 32 of center section 30, thereby serving as a motor support portion 11f. Motor support portion 11f is formed with a recess 11f1 that is open forwardly downward to face the front portion of chamber 10a in transaxle housing 11 incorporating HST 20. The thrust bearing serving as fixed swash plate 54 is fitted into forwardly downward open recess 11f1 to abut against the heads of plungers 53 projecting from motor cylinder block 52. On the other hand, motor support portion 11f is formed with another recess 11f3 that is open rearwardly upward to face the rear portion of chamber 10a in transaxle housing 11 incorporating reduction gear train 70, and a bearing 55 for journaling motor shaft 51 is fitted into rearwardly upward open recess 11f3. A through hole 11f2 is formed in motor support portion 11f between recesses 11f1 and 11f3. Motor shaft 51 is extended rearwardly upward from motor cylinder block 52 and is freely passed through fixed swash plate 54 and through hole 11f2 in motor support portion 11f. Further, motor shaft 51 is fittingly passed through bearing 55, and a tip portion of motor shaft 51 projects rearwardly upward from bearing 55 so as to be fixedly provided thereon with a bevel pinion 71.

The advantage of hydraulic motor 50 having the slant axis with regard to the vertical axis of hydraulic pump 40 is to horizontally and vertically minimize a portion of transaxle 1 incorporating hydraulic motor 50 while ensuring the sufficient length of motor shaft 51 and the sufficient capacity of motor cylinder block 52. Therefore, both the dimension of transaxle 1 in the fore-and-aft direction between pump shaft 41 serving as the input shaft of transaxle 1 and axle 2 serving as the output shaft of transaxle 1 and the dimension of transaxle 1 in the lateral direction are shortened to facilitate the mounting of transaxle 1 on a small vehicle. In this embodiment, the fore-and-aft middle portion of transaxle casing 10 incorporating hydraulic motor 50 between the front portion of transaxle casing 10 incorporating hydraulic pump 40 and the rear portion of transaxle casing 10 incorporating reduction gear train 70 is shortened in the fore-and-aft direction so as to reduce the entire fore-and-aft length of transaxle 1, and is lowered at the top portion thereof so as to reduce the vertical dimension of the fore-and-aft middle portion of transaxle 1.

More specifically, to enhance the effect of reducing the fore-and-aft dimension and vertical dimension of transaxle 1 from pump shaft 41 to the rear upper end of motor shaft 51 that is more distant from pump shaft 41 than the front lower end of motor shaft 51, it is preferable that the vertical axis of pump shaft 41 and the vertically slant axis of motor shaft 51 have an acute angle therebetween. In this regard, preferably, center section 30 is configured so that pump mounting surface 31a and motor mounting surface 32a have an obtuse angle therebetween to ensure such an acute angle arrangement of pump shaft 41 and motor shaft 51.

HST 20 is installed in chamber 10a in transaxle housing 11 while the bottom opening of chamber 10a is opened by removing lower cover 12 from transaxle housing 11 and top opening 11g is opened by removing top cover 13 from transaxle housing 11. In this regard, movable swash plate 44, trunnions 45, and fixed swash plate 54 are inserted into chamber 10a in transaxle housing 11 through the bottom opening of chamber 10a, so that movable swash plate 44 is fitted to pump support portion 11b, right and left trunnions 45 are fitted through trunnion holes 11c and are fixed to movable swash plate 44, and fixed swash plate 54 is fitted to motor support portion 11f.

Then, center section 30 having pump cylinder block 42 on pump mounting surface 31a and having motor cylinder block 52 on motor mounting surface 32a is inserted into chamber 10a in transaxle housing 11 through the bottom opening of chamber 10a so as to make the heads of plungers 43 abut against movable swash plate 44 fitted to pump support portion 11b and so as to make the heads of plungers 53 abut against fixed swash plate 54. Bolts 38 and 39 are passed through holes 34a and 35a of bosses 34 and 35 and are screwed upward into transaxle housing 11, thereby fixing center section 30 to transaxle housing 11.

Cylindrical filter 26 of HST 20 is mounted on an inner surface of lower cover 12. After HST 20 except for filter 26 is assembled in chamber 10a in transaxle housing 11 as mentioned above, lower cover 12 is fitted to the bottom edge of transaxle housing 11 so as to cover the bottom opening of chamber 10a in transaxle housing 11, thereby fitting filter 26 on lower cover 12 to filter mounting surface 31e of center section 30. Then, bolts 16 are screwed into the bottom edge of transaxle housing 11 so as to fasten lower cover 12 to transaxle housing 11. Incidentally, a charge pump such as a trochoidal pump may be disposed in filter 26 and fitted to filter mounting surface 31e of center section 30. The bottom end portion of pump shaft 41 projecting downward in filter 26 from filter mounting surface 31e of center section 30 can be used as a drive shaft for the charge pump disposed in filter 26. Preferably, center section 30 has an inner fluid passage to distribute the fluid delivered from the charge pump to both of valve ports 22a.

Figure 3:
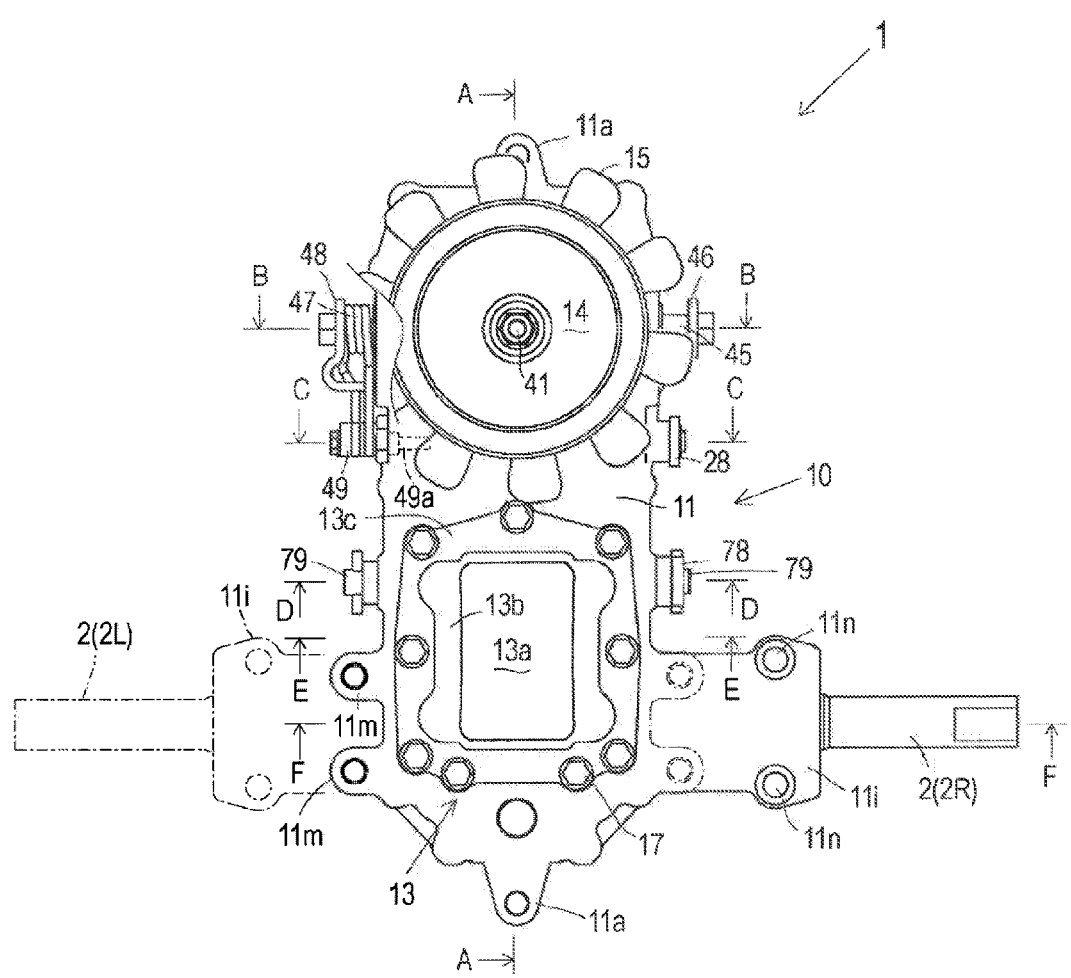
FIG. 3 is a plan view of a transaxle 1 representing each of right and left transaxles 1R and 1L of a zero-turn vehicle.
Figure 4:
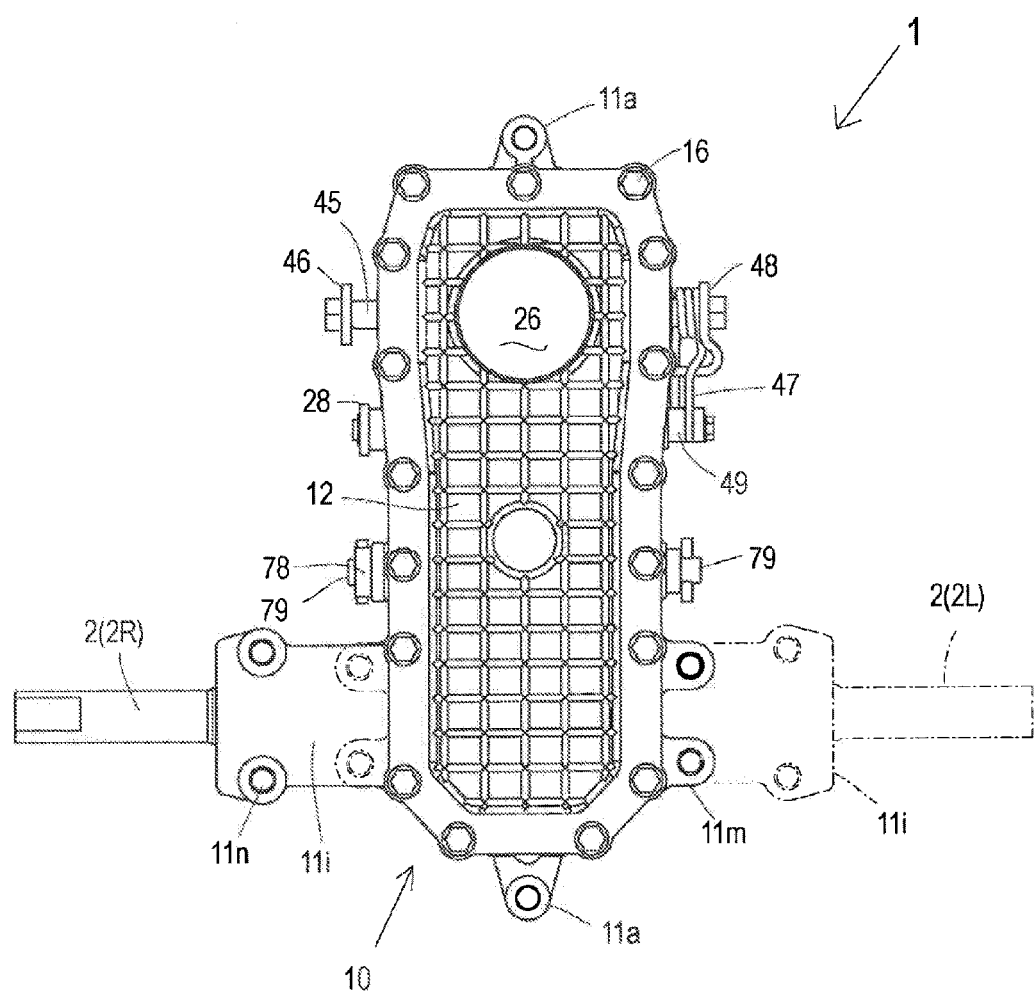
FIG. 4 is a bottom view of transaxle 1.
Figure 5:
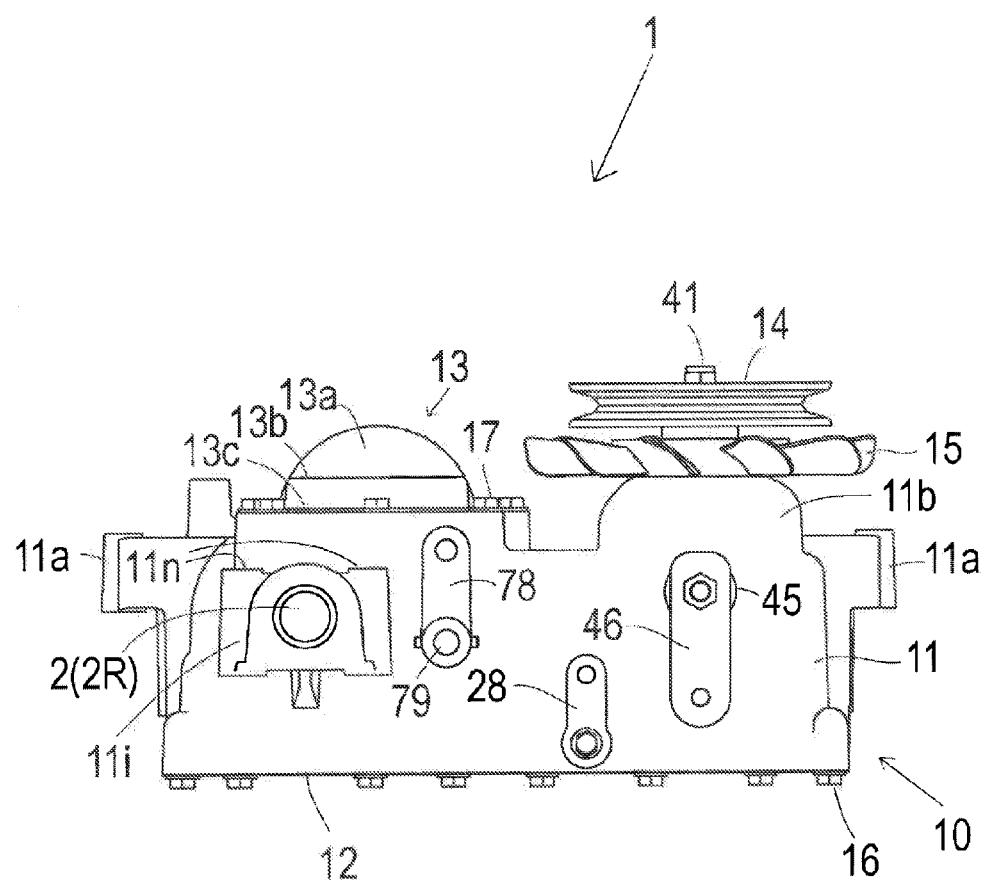
FIG. 5 is a side view of transaxle 1 when viewed from a side toward a distal end of an axle 2 projecting outward from a transaxle casing 10 of transaxle 1.
Figure 14A:
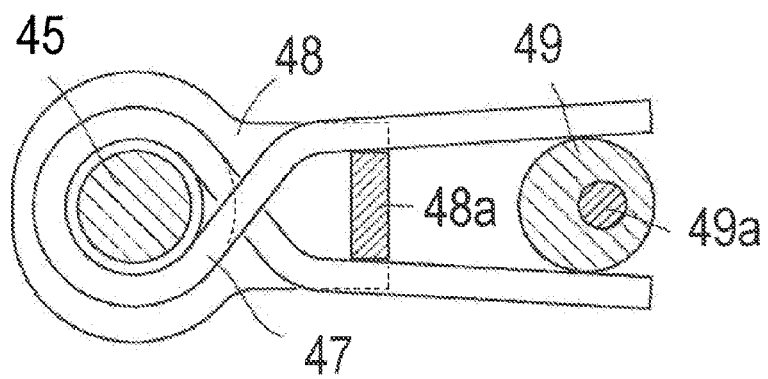
FIG. 14(a) is a sectional side view of a trunnion 45 and an eccentric pin 49 showing neutral return spring 47 when a movable swash plate 44 of HST 20 is disposed at a neutral position.
Figure 14B:
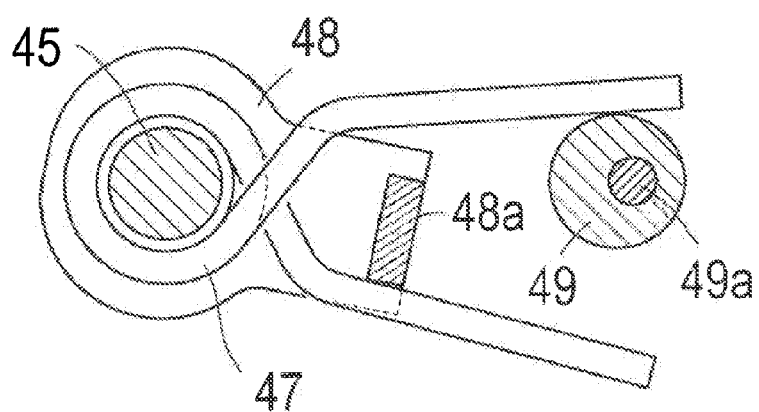
FIG. 14(b) is a sectional side view of trunnion 45 and eccentric pin 49 showing neutral return spring 47 when movable swash plate 44 of HST 20 is not disposed at the neutral position.
Figure 15:
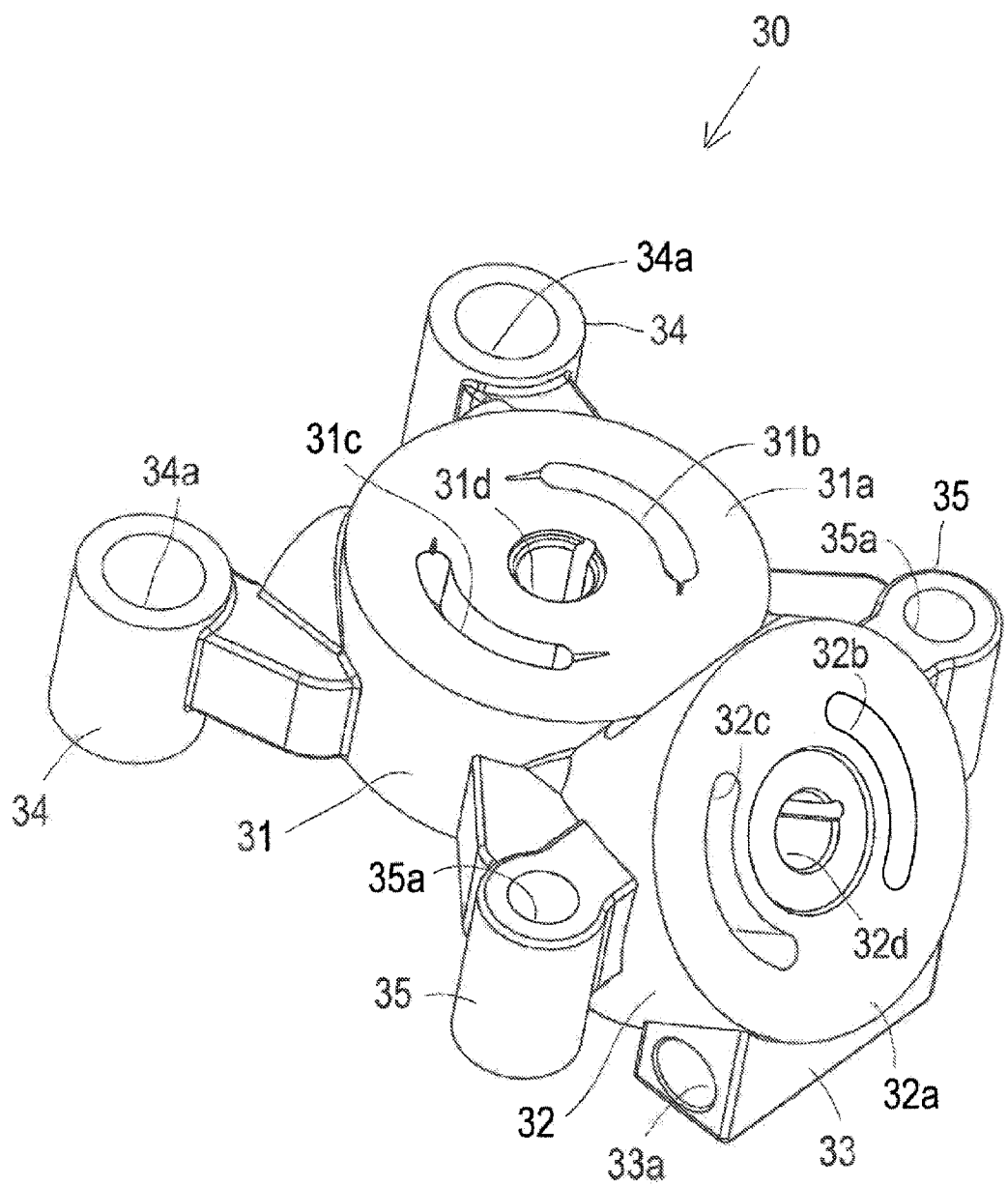
FIG. 15 is a perspective view of a center section 30 for HST 20.
Figure 16:
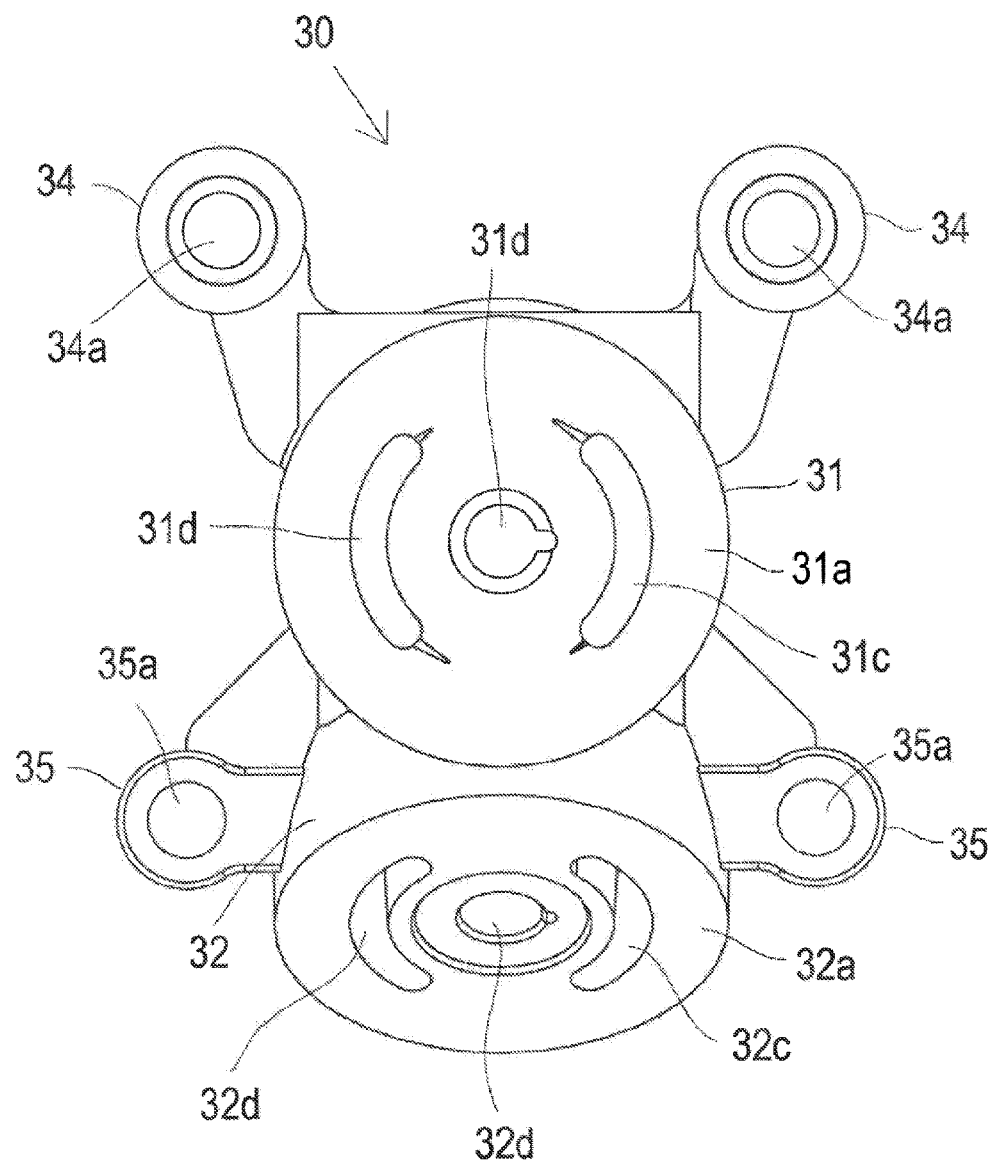
FIG. 16 is a plan view of center section 30.

Further, HST control arm 46 is fixed on the distal end portion of one of right and left trunnions 45 projecting outward from transaxle housing 11 so that the tilt angle and direction of movable swash plate 44 of hydraulic pump 40 is controlled by rotating HST control arm 46. On the other hand, a neutral return spring 47 and a spring retainer 48 are provided on the distal end portion of one of right and left trunnions 45 opposite HST control arm 46. In this regard, as shown in FIGS. 3, 14(*a*) and 14(*b*), neutral return spring 47 is coiled on the distal end portion of trunnion 45 and both end portions of neutral return spring 47 are twisted to cross each other and are extended rearward. Spring retainer 48 is fixed on the distal end portion of trunnion 45 by a nut so as to cover the coiled neutral return spring 47. Spring retainer 48 is formed with a stopper 48a that is disposed between the rearwardly extended end portions of neutral return spring 47.

As shown in FIG. 9, a right or left side wall of transaxle housing 11 adjacently rearward from trunnion 45 having neutral returning spring 47 and spring retainer 48 thereon is formed with an eccentric pin hole 11d, and a laterally horizontal axis shaft 49a of an eccentric pin 49 is fitted into eccentric pin hole 11d. In this regard, the right and left side walls of transaxle housing 11 adjacently rearward from right and left trunnion holes 11c are formed to have sufficient thickness before boring eccentric pin hole 11d so that either the right or left wall can be selectively bored with eccentric pin hole 11d.

Eccentric pin 49 is fitted on a portion of axis shaft 49a projecting outward from transaxle housing 11 and a nut is screwed on a distal end of axis shaft 49a so as to fasten eccentric pin 49 to axis shaft 49a. The biasing force of spring 47 functions to move both rearwardly extended end portions of spring 47 toward each other when viewed in side. Therefore, movable swash plate 44 and HST control arm 46 are set at their neutral positions when both end portions of spring 47 pinch eccentric pin 49 therebetween as shown in FIG. 14(*a*). When HST control arm 46 fixed on one trunnion 45 is rotated to move movable swash plate 44 from the neutral position, spring retainer 48 fixed on the other trunnion 45 also rotates so that stopper 48a pushes one end portion of spring 47 away from the other end portion of spring 47 as shown in FIG. 14(*b*), thereby generating the above-mentioned biasing force of spring 47. When HST control arm 46 having been moved from the neutral position is released, both ends of spring 47 are returned by their own biasing force to pinch eccentric pin 49, thereby returning movable swash plate 44 and HST control arm 46 to their neutral positions.

Due to the eccentricity of eccentric pin 49 relative to axis shaft 49a, the neutral position of HST control arm 46 (defined as the position where both end portions of spring 47 pinch eccentric pin 49) can be adjusted relative to the real neutral position of movable swash plate 44 for stopping the fluid delivery from hydraulic pump 40. In this regard, by loosening the nut, the rotational position of eccentric pin 49 pinched by neutral returning spring 47 relative to axis shaft 49a can be changed to adjust the neutral position of HST control arm 46 relative to the neutral position of movable swash plate 44.

Further, as shown in FIG. 9, right and left symmetric bypass valve holes 11e are formed through right and left side walls of transaxle housing 11 facing respective right and left end surfaces of bypass valve block 33 of center section 30. As mentioned above, laterally horizontal axial bypass valve 27 is fitted in bypass valve hole 33a rotatably relative to center section 30. One of right and left ends of bypass valve 27 is disposed in bypass valve hole 33a and the other of right and left ends of bypass valve 27 projects outward from the corresponding right or left end of bypass valve block 33 and is passed through corresponding right or left bypass valve hole 11e rotatably relative to transaxle housing 11 so as to project outward from transaxle housing 11. A bypass valve arm 28 is fixed on the end portion of bypass valve 27 projecting from transaxle housing 11. In this way, either right or left bypass valve hole 11e can be selectively used for passing bypass valve 27.

Figure 11:
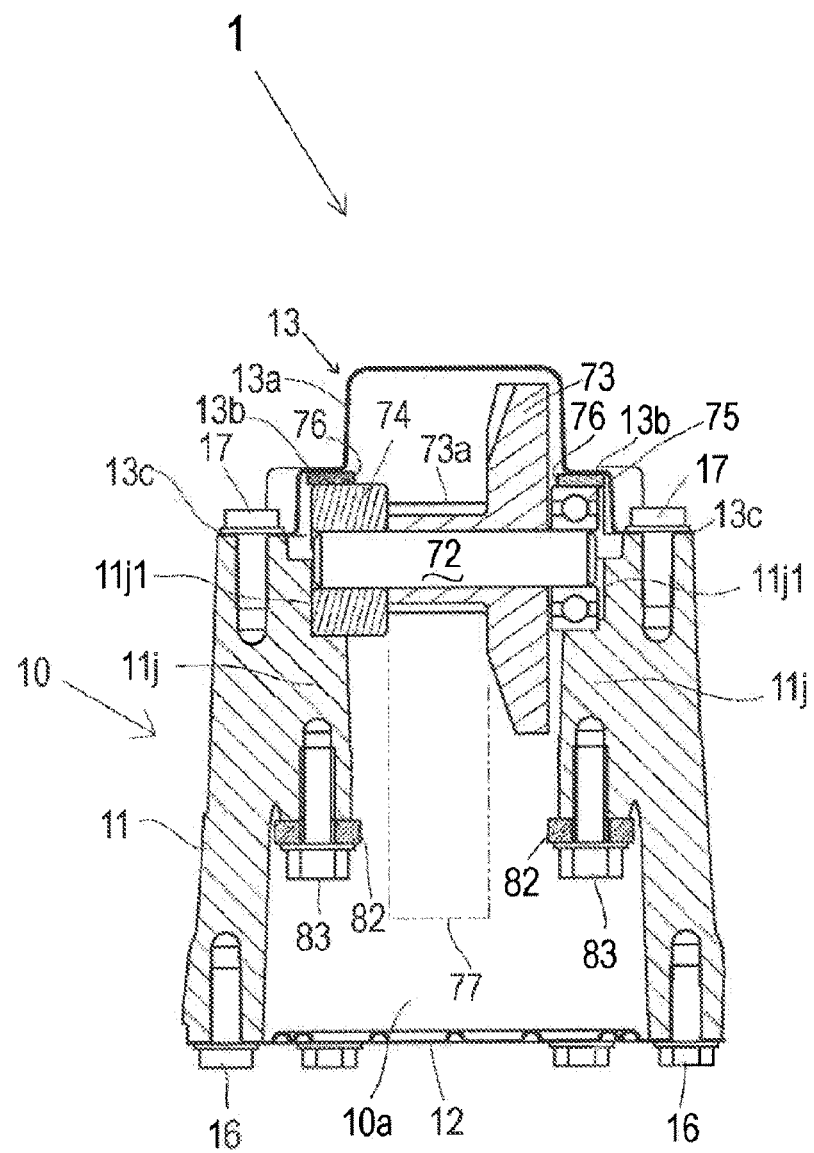
FIG. 11 is a cross sectional rear view of transaxle 1 taken along E-E arrows of FIG. 3 wherein an HST 20 and relevant arms are omitted.

As shown in FIGS. 6 and 11, a laterally horizontal gear shaft 72 is disposed in chamber 10a adjacent to the fore-and-aft middle portion of top opening 11g and is supported at right and left ends thereof by right and left side walls 11j. In this regard, top edges of right and left side walls 11j facing top opening 11g are formed with respective recesses 11j1 facing each other. A bearing 74 is fitted in recess 11j1 of one side wall 11j so as to journal one end of gear shaft 72. A bearing 75 is fitted in recess 11j1 of the other side wall 11j so as to journal the other end of gear shaft 72. Right and left bearings 74 and 75 project upward from the top edges of side walls 11j, and right and left bearing covers 76 are provided on the top edges of side walls 11j so as to cover respective bearings 74 and 75.

Referring to FIGS. 6 and 10 to 13, a bevel gear 73 formed with a spur pinion 73a is fixed on gear shaft 72 between right and left bearings 74 and 75. Bevel gear 73 meshes with bevel pinion 71 fixed on the tip portion of motor shaft 51. An axial boss of bevel gear 73 extended along gear shaft 72 serves as spur pinion 73a. A spur bull gear 77 is fixed on axle 2 supported by transaxle housing 11 and meshes with spur pinion 73a. Therefore, pinions 71 and 73a and gears 73 and 77 constitute reduction gear train 70 for transmitting power from motor shaft 51 of HST 20 to axle 2.

Transaxle 1 includes a gear locking mechanism for applying a parking brake to reduction gear train 70 and axle 2, the gear locking mechanism including a locking pawl 80 adapted to engage with bevel gear 73 meshing with bevel pinion 71 fixed on motor shaft 51. Referring to FIG. 10, right and left symmetric shaft holes 11h are formed through right and left side walls of transaxle housing 11, and a laterally horizontal locking shaft 79 is supported through right and left shaft holes 11h rotatably relative to transaxle housing 11. Either the right or left end of locking shaft 79 is selected to have a locking arm 78 fixed thereon. Referring to FIGS. 6, 10 to 13, bevel gear 73 is peripherally formed on a back surface thereof with plural recesses 73b. A locking pawl 80 is fixed on locking shaft 79. By rotating locking arm 78 and locking shaft 79, locking pawl 80 is shiftable between a locking position where locking pawl 80 is hooked into any one of recesses 73b to lock gear 73 and an unlocking position where locking pawl 80 is not hooked into any recess 73b. By setting locking pawl 80 at the locking position, gear 73 is locked, thereby stopping axle 2 for parking vehicle 100 or 200.

In this regard, referring to FIG. 10, locking shaft 79 is formed with right and left pin holes 79a. One of pin holes 79a is selected and a lock pin 80a is inserted into selected pin hole 79a to fasten locking pawl 80 to locking shaft 79. Whether right or left pin hole 79a is selected depends on whether bevel gear 73 is disposed rightward or leftward of pinion 73a. In the embodiment of FIG. 10, right pin hole 79a is selected to fix locking pawl 80 to locking shaft 79 because bevel gear 73 is disposed rightward of pinion 73a.

More specifically, the rotary direction of axle 2 depends on the rotary direction of bevel gear 73 and pinion 73a, and the rotary direction of bevel gear 73 depends on whether bevel pinion 71 meshes with bevel gear 73 at the right or left side thereof, i.e., whether bevel gear 73 is disposed rightward or leftward of pinion 73a. Therefore, if the rotary direction of pump shaft 41 relative to an engine mismatches with the rotary direction of axle 2 for ensuring the desired travel direction of the vehicle, bevel gear 73 with pinion 73a can be reversed to change its position relative to bevel pinion 71 so as to correctly match the rotary direction of axle 2 with the rotary direction of pump shaft 41 relative to the engine for ensuring the desired travel direction of the vehicle.

Referring to FIGS. 3, 5 and 11 to 13, top cover 13 is formed with a central cover portion 13a, a flange 13c, and right and left side cover portions 13b between central cover portion 13a and flange 13c. Flange 13c is fastened onto a top edge of transaxle housing 11 surrounding top opening 11g by screwing bolts 17 downward into the ceiling wall of transaxle housing 11, thereby fixing top cover 13 on transaxle housing 11 so that central cover portion 13a and surrounding cover portion 13b cover top opening 11g. Central cover portion 13a is arc-shaped in the side view along the periphery of the upper portion of bevel gear 73 projecting upward from top edges of side walls 11j of transaxle housing 11. Right and left side cover portions 13b have respective horizontal flat surfaces that are lower than the major part of central cover portion 13a. The horizontal flat surfaces of right and left horizontal side cover portions 13b are fitted onto the top portions of right and left bearing covers 76 projecting upward from the top edges of side walls 11j of transaxle housing 11.

Figure 12:
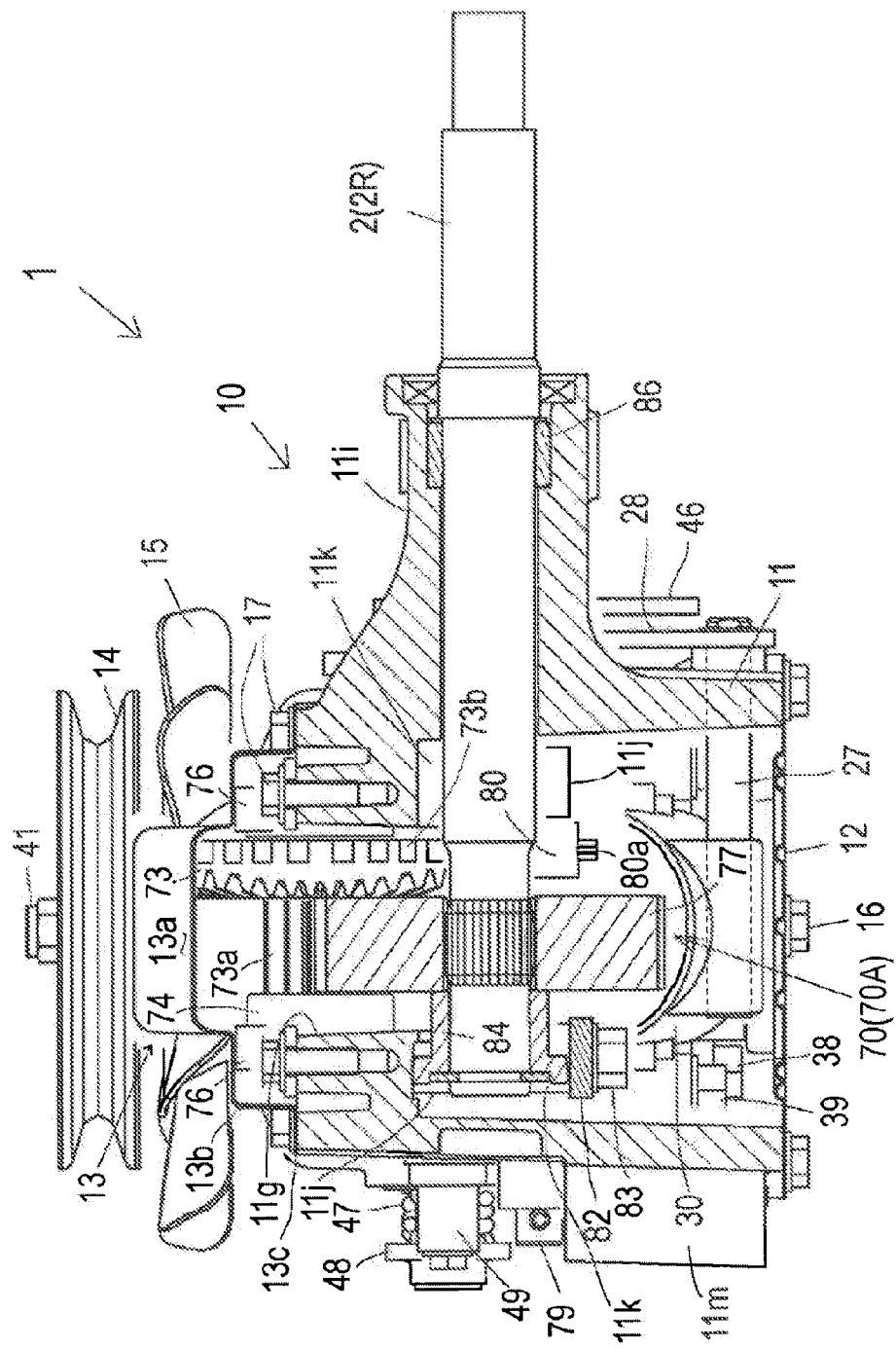
FIG. 12 is a cross sectional rear view of transaxle 1 taken along F-F arrows of FIG. 3.
Figure 13:
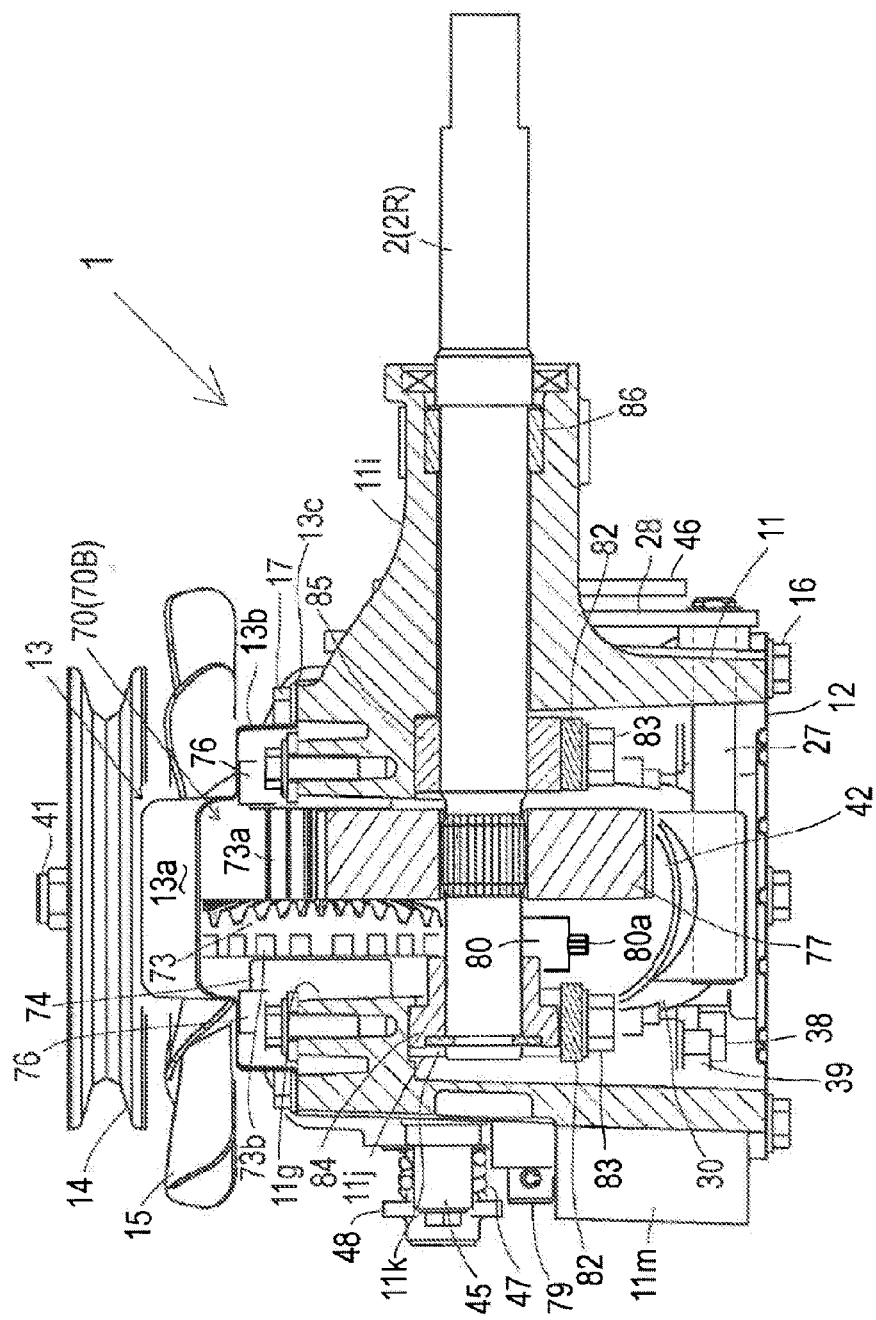
FIG. 13 is the same cross sectional rear view of transaxle 1 as FIG. 12 except for an alternative reduction gear train 70B.

Referring to FIGS. 12 and 13, axle support portion 11i journals axle 2 via a bearing 86. Axle 2 supported by axle support portion 11i is extended at a distal portion thereof outward from a distal end of axle support portion 11i, and is extended at a proximal portion thereof into chamber 10a in transaxle housing 11 between right and left side walls 11j so as to be fixedly provided thereon with bull gear 77 meshing with pinion 73a.

In this regard, as shown in FIG. 6, each of right and left side walls 11j is formed to have a reverse U-shaped edge 11k defining top, front and rear ends of an opening that laterally penetrates each side wall 11j and is downwardly open. A bearing 84 is disposed in the opening defined by one of right and left edges 11k or bearings 84 or 85 are disposed in the openings defined by respective right and left edges 11k so as to journal axle 2. Each reverse U-shaped edge 11k has front and rear bottom ends to which a support plate 82 can be fastened by front and rear bolts 83 so as to close the downward open end of the opening, thereby supporting bearing 84 or 85 in the opening defined by edge 11k.

Regardless of whether transaxle 1 serves as right transaxle 1R or left transaxle 1L, two types are prepared as reduction gear train 70 of transaxle 1 as mentioned above. One type referred to as a reduction gear train 70A has bevel gear 73 being closer to axle support portion 11i than pinion 73a, as shown in FIG. 12. The other type referred to as a reduction gear train 70B has bevel gear 73 being more distant from axle support portion 11 than pinion 73a, as shown in FIG. 13.

When reduction gear train 70A having bevel gear 73 rightward of pinion 73a in FIG. 12 is selected as reduction gear train 70 of transaxle 1, bull gear 77 meshing with pinion 73a approaches the proximal end of axle 2 so as to sufficiently receive the support force from bearing 84 fitted to one reverse U-shaped edge 11k. Therefore, it is unnecessary to use the opening defined by the other reverse U-shaped edge 11k closer to axle support portion 11i for journaling axle 2 so that axle 2 is journalled at two points by bearings 84 and 86.

When reduction gear train 70B having bevel gear 73 leftward of pinion 73a in FIG. 13 is selected as reduction gear train 70 of transaxle 1, bull gear 77 meshing with pinion 73a comes distant from bearing 84 so as to insufficiently receive the support force from bearing 84. Therefore, the opening defined by reverse U-shaped edge 11k closer to axle support portion 11i has bearing 85 journaling an axial intermediate portion of axle 2 therein. In this regard, bearing 85 journaling axle 2 is fitted to edge 11k, and another support plate 82 is fastened to front and rear bottom ends of edge 11k fitting bearing 85 by front and rear bolts 83 so as to close the downward open end of the opening, thereby supporting bearing 85. Therefore, axle 2 is journalled at three points by bearings 84, 85 and 86.

Referring to FIGS. 21 to 30, description will be given of an alternative transaxle 1A including axle 2, an HST 120 and a reduction gear train 170 for transmitting power from HST 120 to axle 2. Transaxle 1A has members and portions designated by the same reference numerals as those used for transaxle 1. Description of these members and portions of transaxle 1A will be omitted unless otherwise specifically noted, because they are identical or similar to the corresponding members and portions of transaxle 1 with regard to arrangement, structure, function and the like. Further, some reference numerals to be used to designate corresponding members and portions of transaxle 1 are omitted from the drawings illustrating transaxle 1A on the premise that the members and portions of transaxle 1A illustrated as being identical or similar to the corresponding members and portions of transaxle 1 should have been marked with the same reference numerals as those designating the corresponding members and portions of transaxle 1. Further, on the assumption that HST 120 is disposed forward from axle 2 and reduction gear train 170, illustrated transaxle 1A serves as right transaxle 1R carrying right axle 2R, however, transaxle 1A may be adapted as left transaxle 1L carrying left axle 2L.

A transaxle casing 110 of transaxle 1A includes an upper transaxle housing 111, a lower transaxle housing 112, and a gear top cover 113. Bolts 116 are screwed upward to fasten a flanged top edge of lower transaxle housing 112 to a bottom edge of upper transaxle housing 11 fringing a bottom opening of upper transaxle housing 111. Bolts 117 are screwed downward to fasten a flanged bottom edge of gear top cover 113 to a top edge of a rear half portion of upper transaxle housing 111 fringing a top opening of the rear half portion of upper transaxle housing 111.

In comparison with substantially horizontally flat thin plate-shaped bottom cover 12 fixed to the bottom edge of transaxle housing 11 defining the bottom end of transaxle casing 10, lower transaxle housing 112 has an inner space whose vertical dimension defines a depth for accommodating a lower portion of bull gear 77 and a lower portion of HST 120. Especially, center section 30 fastened to upper transaxle housing 111 via bolts 38 and 39 screwed through bosses 34 and 35 has filter mounting surface 31e (see FIGS. 17 and 20) that is level with the bottom edge of upper transaxle housing 111, and the top edge of cylindrical filter 26 accommodated in lower transaxle housing 112 is level with the top edge of lower transaxle housing 112, so that the top edge of filter 26 in lower transaxle housing 112 can be easily fitted to filter mounting surface 31e, and the top outer peripheral surface of filter 26 to filter retainers 31i, when the bottom edge of upper transaxle housing 111 is joined to the top edge of lower transaxle housing 112.

As discussed later, transaxle 1A is provided with a gear locking system 180 for applying a parking brake to reduction gear train 170 and axle 2. In this regard, referring to FIG. 22, gear top cover 113 of transaxle casing 110 for accommodating an upper portion of reduction gear train 170 supports locking shaft 79 of gear locking system 180, in comparison with transaxle housing 11 of transaxle casing 10 that supports locking shaft 79. Therefore, gear top cover 113 of transaxle casing 110 for transaxle 1A is a thick cover made by die-casting or the like so as to ensure a sufficient rigidity for supporting locking shaft 79, in comparison with thin plate-shaped gear top cover 13 of transaxle casing 10 for transaxle 1, which does not support locking shaft 79.

Figure 26:
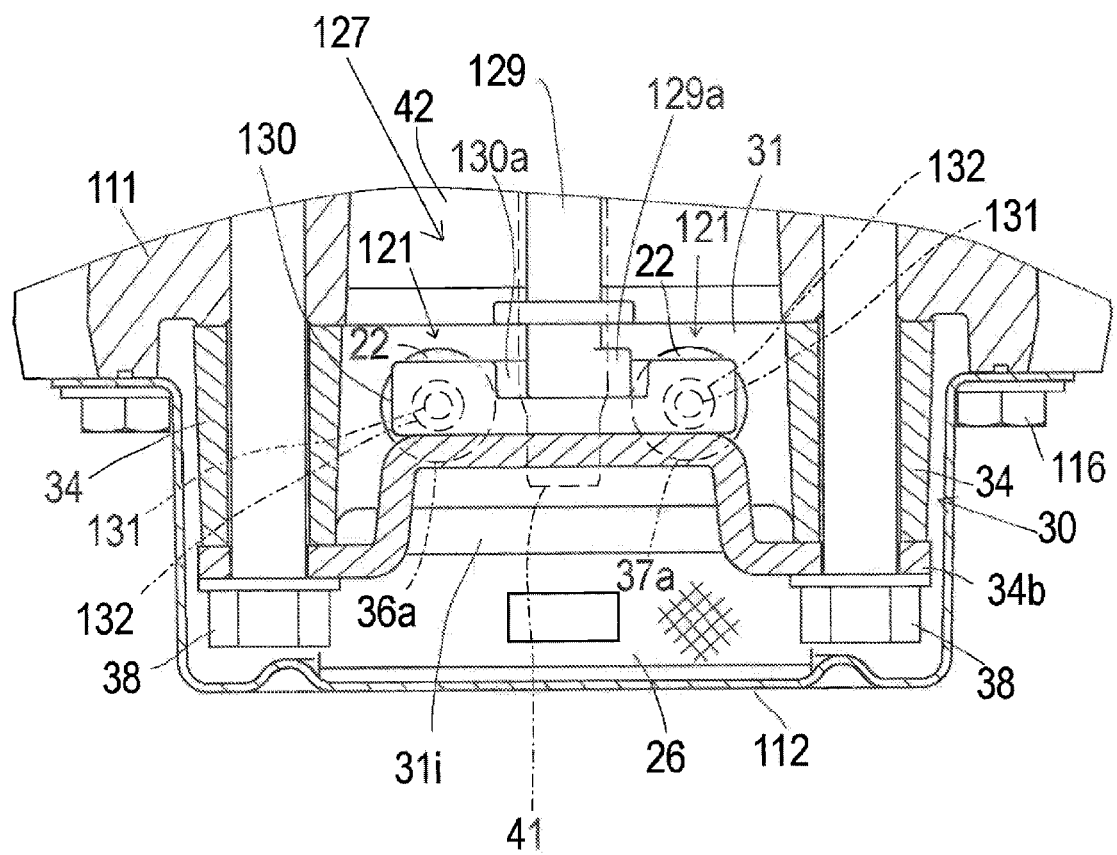
FIG. 26 is a fragmentary sectional front view of transaxle 1A taken along K-K arrows of FIG. 22, showing front views of charge check and bypass valves 121 in HST 120 and a bypass valve operation mechanism 127.
Figure 27:
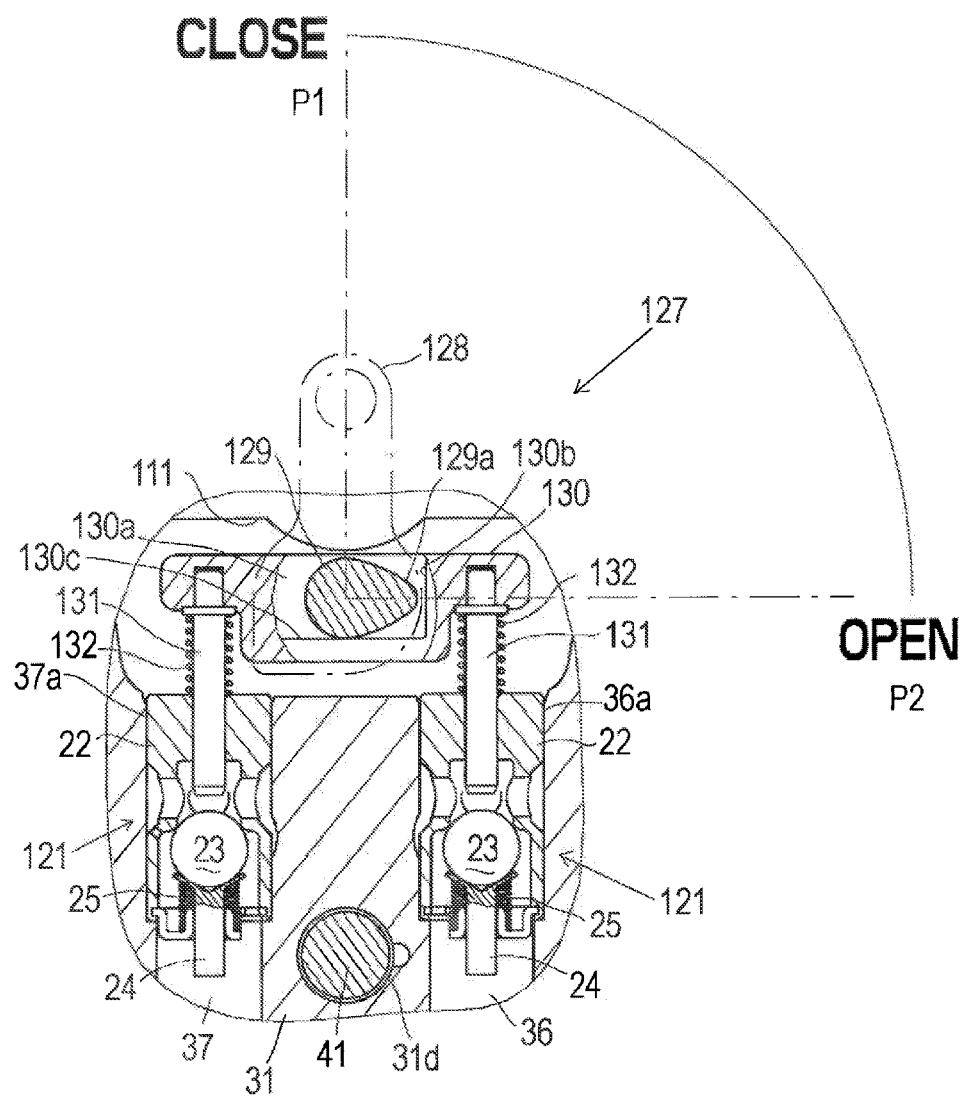
FIG. 27 is a fragmentary sectional plan view of transaxle 1A taken along L-L arrows of FIG. 23, showing front views of charge check and bypass valves 121 in HST 120 and bypass valve operation mechanism 127.
Figure 28:
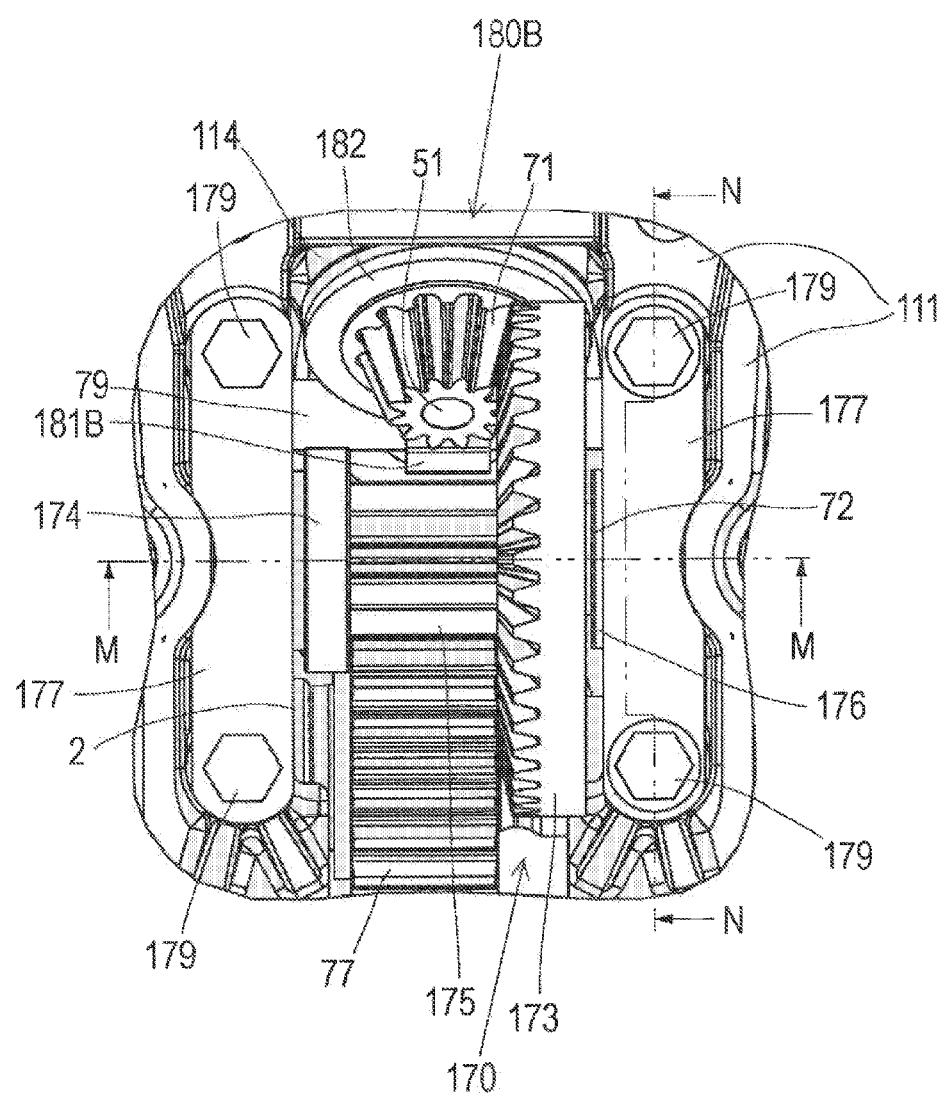
FIG. 28 is a plan view of reduction gear train 170 in transaxle casing 110 of transaxle 1A from which a gear top cover 113 has been removed, showing a gear locking system 180B serving as another embodiment of gear locking system 180.

Features of HST 120 of transaxle 1A distinguished from corresponding features of HST 20 of transaxle 1 will be described. Referring to FIGS. 26 and 27, right and left charge check and bypass valves 121 are fitted in respective right and left charge check valve chambers 36a and 37a formed in center section 30. Right and left charge check and bypass valves 121 serve as right and left charge check valves 21 excluding that right and left charge check and bypass valves 121 are additionally provided with respective pressure rods 131 that are disposed parallel to each other mechanically operably for simultaneous opening of right and left charge check and bypass valves 121. Therefore, HST 120 does not have an additional bypass valve corresponding to bypass valve 27 disposed in center section 30, so that center section 30 can be formed without bypass valve hole 33a for accommodating bypass valve 27 and/or without bypass ports 33b and 33c for fluidly connecting bypass valve 27 to a fluid sump in transaxle casing 110, thereby reducing processes to form center section 30.

Referring to FIGS. 22, 23, 26, and 27, transaxle 1A is provided with a bypass valve operation mechanism 127 for operating right and left charge check and bypass valves 121 to function as bypass valves. Bypass valve operation mechanism 127 includes a relief valve operation arm 128, a vertical camshaft 129 formed with a cam 129a, a pressure member 130, right and left pressure rods 131, and springs 132 wound around respective pressure rods 131. Upper transaxle housing 111 journals vertical camshaft 129. Relief valve operation arm 128 is fixed on a top end of camshaft 129 projecting upward from upper transaxle housing 111 of transaxle casing 110. Referring to FIG. 27, bypass valve operation arm 128 is rotatable to be shifted between a valve-close position P1 as drawn in phantom lines and a valve-open position P2.

Figure 22:
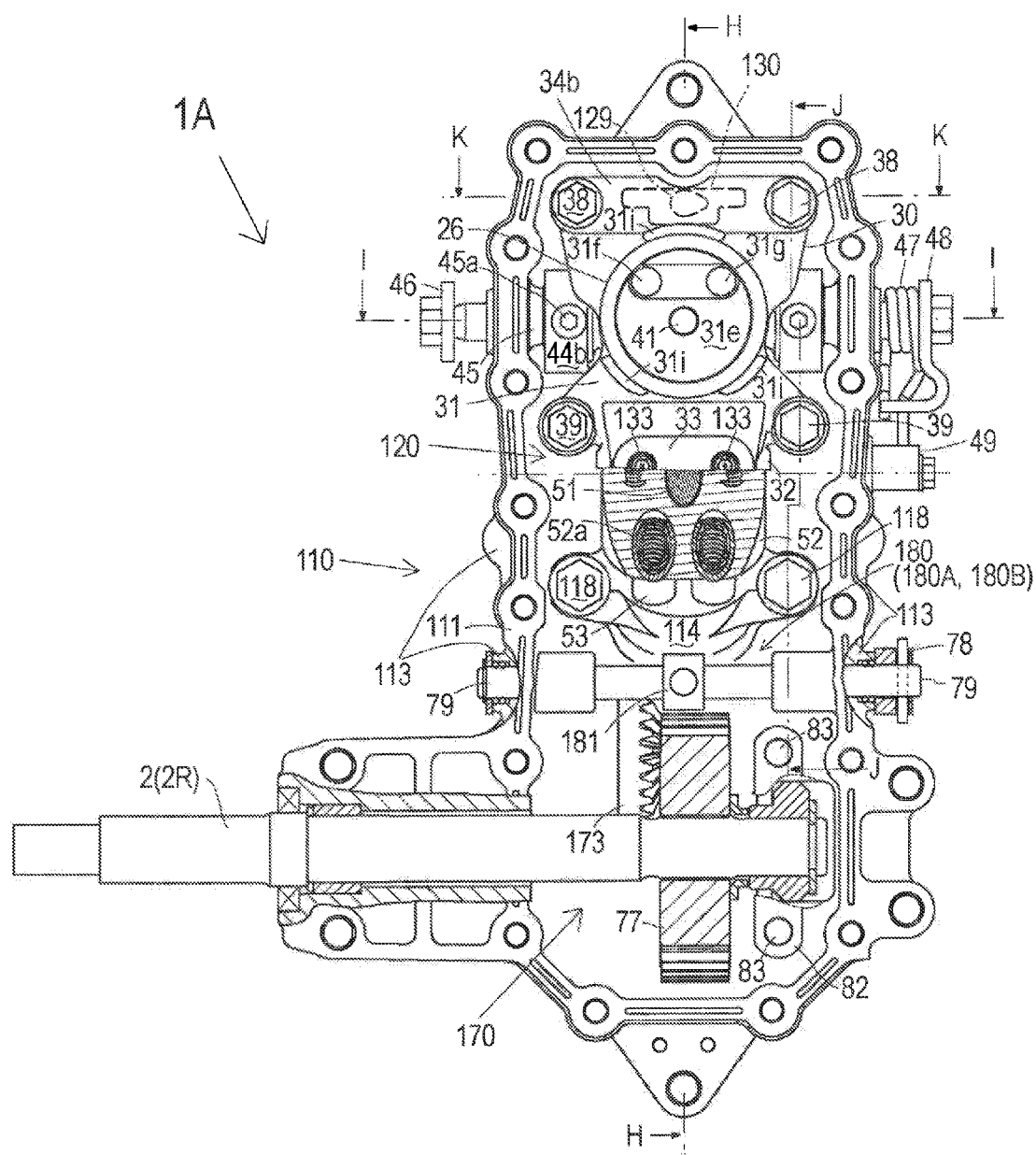
FIG. 22 is a sectional bottom view of transaxle 1A taken along G-G arrows of FIG. 21, showing bottom views of axle 2, an HST 120, reduction gear train 170 and a gear locking system 180 in a transaxle casing 110 from which a lower transaxle housing 112 has been removed.

Referring to FIGS. 22 and 26, a bottom plate 34b is interposed between bottom surfaces of right and left front bosses 34 and bottom heads of bolts 38. Pressure member 130 is disposed in a space between right and left front bosses 34 and slidably abuts at a bottom horizontal surface thereof against a top horizontal surface of bottom plate 34b. Pressure member 130 is formed with right and left vertical surface 130b and a rear vertical surface 130c defining an upwardly open recess 130a. Cam 129a formed on a bottom end of camshaft 129 is disposed in recess 130a. Right and left pressure rods 131 are extended rearward from right and left portions of pressure member 130 and are inserted into respective valve casings 22. Springs 132 wound around respective pressure rods 131 are interposed between the right and left portions of pressure member 130 and front end surfaces of respective valve casings 22 so as to bias pressure member 130 forward.

When bypass valve operation arm 128 is disposed at valve-close position P1 as drawn in phantom lines, cam 129a is directed to right or left vertical surface 130b so that pressure member 130 is located at its forward limit position by the forward biasing forces of springs 132. In this state, rear ends of pressure rods 131 are spaced from respective ball valve members 23 so as to allow ball valve members 23 forwardly biased by respective springs 25 to function as charge check valves. On the other hand, when bypass valve operation arm 128 is disposed at valve-open position P2, cam 129a is directed rearward so as to contact rear vertical surface 130c, thereby pushing pressure member 130 and pressure rods 131 rearward against springs 132. In this state, the rear ends of pressure rods 131 push respective ball valve members 23 rearward against springs 25 so as to open respective valve ports 22a (see FIG. 19) to respective main fluid passages 36 and 37, thereby draining pressurized fluid from main fluid passages 36 and 37 to the fluid sump in transaxle casing 110.

Figure 23:
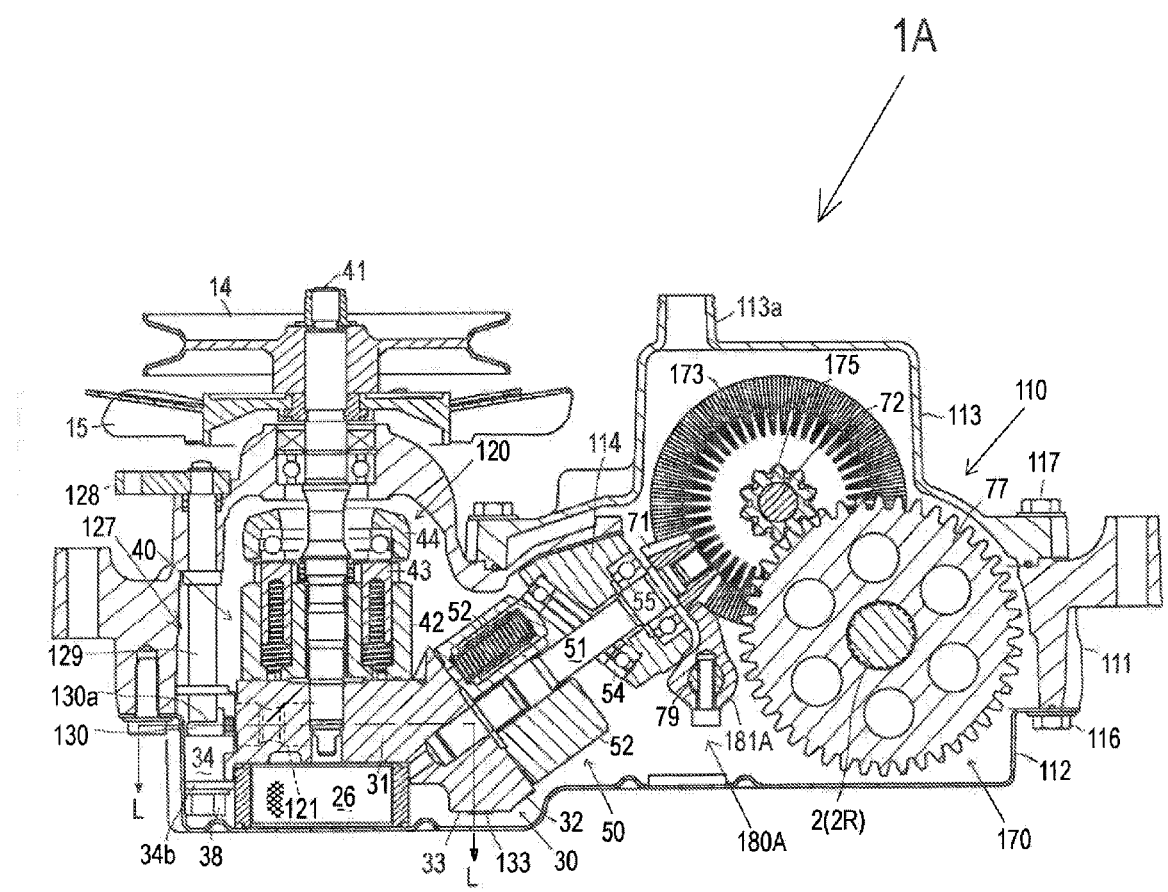
FIG. 23 is a sectional side view of transaxle 1A taken along H-H arrows of FIG. 22, showing sectional side views of axle 2, HST 120, reduction gear train 170 and a gear locking system 180A as an embodiment of gear locking system 180.
Figure 24:
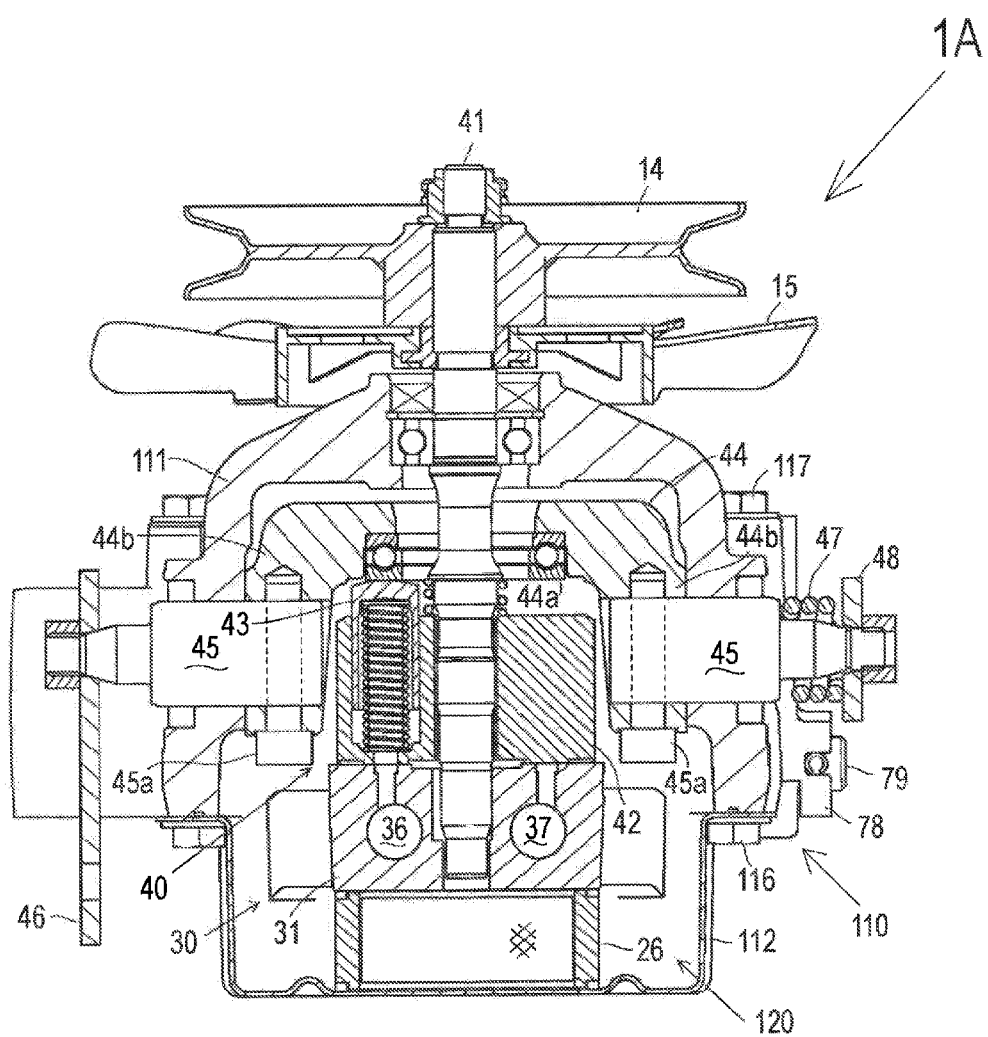
FIG. 24 is a sectional front view of transaxle 1A taken along I-I arrows of FIG. 22, showing a sectional font view of HST 120.
Figure 25:
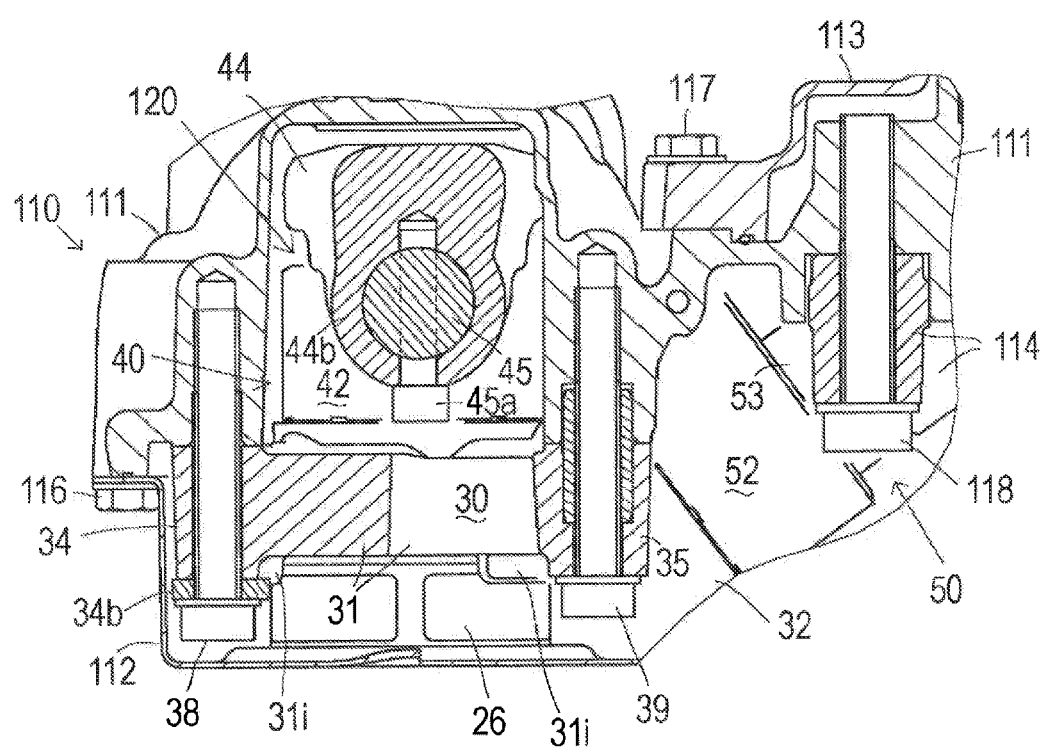
FIG. 25 is a fragmentary sectional side view of transaxle 1A taken along J-J arrows of FIG. 22, showing a sectional side view of HST 120.

A motor swash plate support member 114 is fixedly disposed in transaxle casing 110 so as to support the thrust bearing serving as fixed swash plate 54 of hydraulic motor 50 mounted on motor port block 32 of center section 30 and so as to journal slant motor shaft 51 of hydraulic motor 50, in comparison with motor support portion 11f that is formed on transaxle housing 11 so as to support fixed swash plate 54 and motor shaft 51. Referring to FIGS. 22, 23, and 25, upper transaxle housing 111 is formed to extend under gear top cover 113 so as to cover an upper surface of motor swash plate support member 114, and motor swash plate support member 114 is fastened to the extended portion of upper transaxle housing 111 under gear top cover 113 via bolts 118.

The advantage of motor swash plate support member 114 separated from transaxle casing 110 is that motor swash plate support member 114 is reversible so as to enable fixed swash plate 54 to be reversed in correspondence to which rotational direction of pump shaft 41 relative to motor shaft 51 is designed. Therefore, it is unnecessary to design a later-discussed bevel gear 173 of reduction gear train 170 as being reversible in correspondence to the rotational direction of pump shaft 41 relative to motor shaft 51. On the contrary, as mentioned above, reduction gear train 70 of transaxle 1 has bevel gear 73 designed to be reversible in accordance with the rotational direction of pump shaft 41 relative to motor shaft 51 because fixed swash plate 54 supported by motor support portion 11f of transaxle housing 11 is not reversible.

An upper rear end of slant motor shaft 51 projects upwardly rearward from motor swash plate support member 114 so as to be fixedly provided thereon with bevel pinion 71. Bevel pinion 71 meshes with bevel gear 173 corresponding to bevel gear 73 of transaxle 1. Referring to FIG. 22, representative gear locking system 180 for transaxle 1A has a representative locking pawl 181 engageable with bevel pinion 71 in comparison with the gear locking system for transaxle 1 having locking pawl 80 engageable with bevel gear 73. In this regard, as discussed later, gear locking system 180 is representative of gear locking systems 180A and 180B, and locking pawl 181 is representative of locking pawls 181A and 181B. Therefore, bevel gear 173 is not formed with recesses for engagement with locking pawl 181. The use of bevel pinion 71 to engage with locking pawl 181 is advantageous in consideration of a case that large bevel gear 73 meshing with bevel pinion 71 may be hard to be formed with recesses 73b by sintering or the like.

Figure 29A:
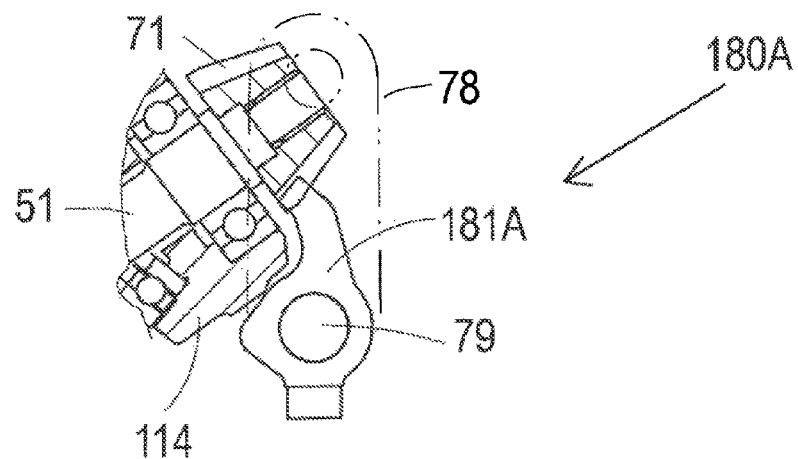
FIG. 29(a) is a sectional side view of gear locking system 180A when a locking pawl 181A engages with bevel pinion 71.
Figure 29B:
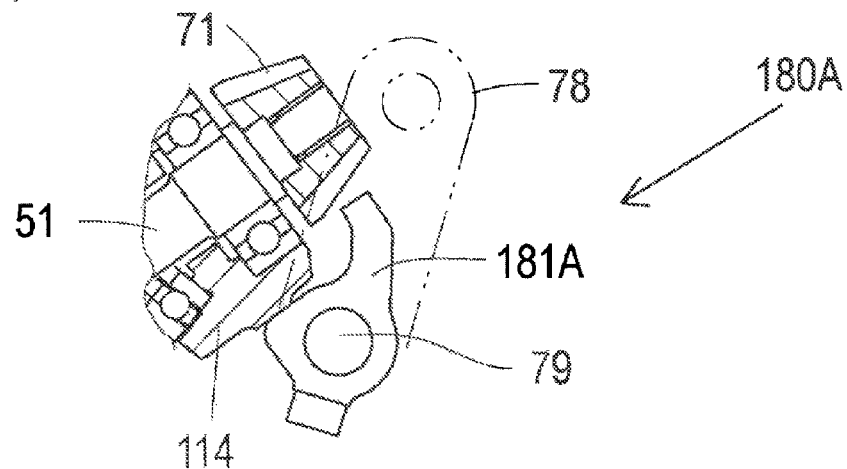
FIG. 29(b) is a sectional side view of gear locking system 180A when locking pawl 181A disengages from bevel pinion 71.
Figure 29C:
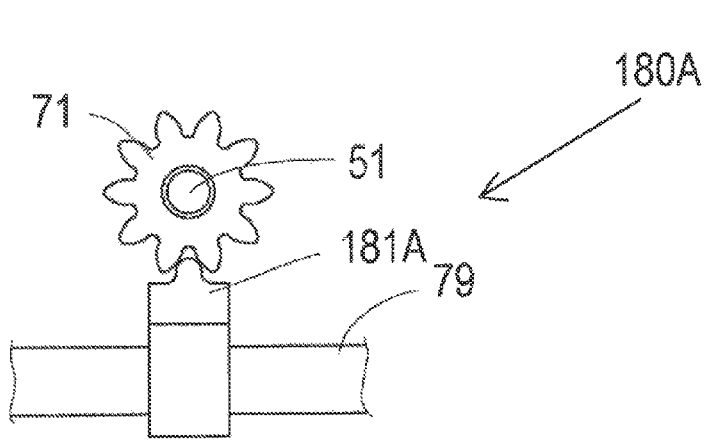
FIG. 29(c) illustrates gear locking system 180A when viewed in the axial direction of a motor shaft 51.

Either a gear locking system 180A or a gear locking system 180B serves as gear locking system 180. Referring to FIGS. 23, 29(a), 29(b), and 29(c), gear locking system 180A is configured to have a locking pawl 181A adapted to be directly engaged into one of recesses among gear teeth of bevel pinion 71. FIG. 29(a) illustrates locking pawl 181A rotated forward to be engaged in one of the recesses among gear teeth of bevel pinion 71 so as to engage with bevel pinion 71. FIG. 29(b) illustrates locking pawl 181A rotated rearward to be removed from the recess of bevel pinion 71 so as to disengage from bevel pinion 71.

Figure 30A:
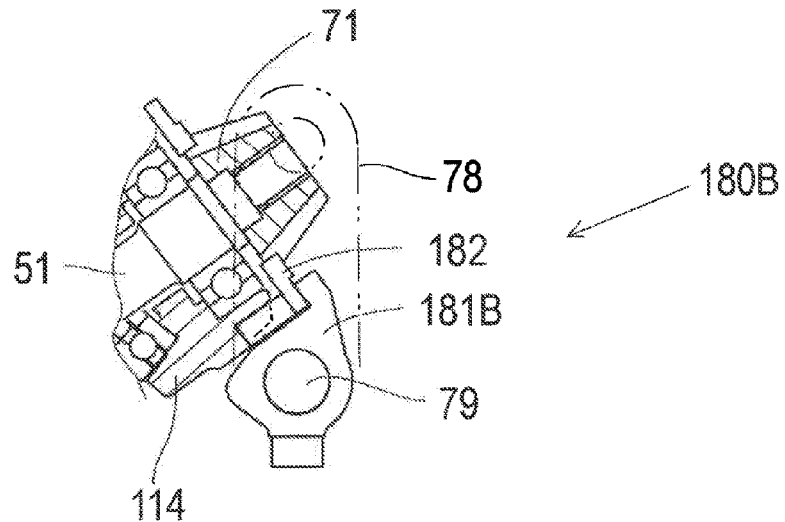
FIG. 30(a) is a sectional side view of gear locking system 180B when a locking pawl 181B engages with bevel pinion 71 via an engagement plate 182.
Figure 30B:
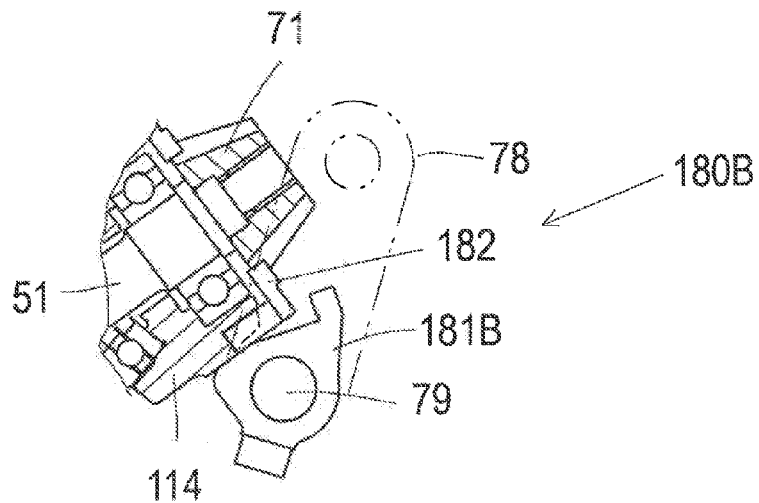
FIG. 30(b) is a sectional side view of gear locking system 180B when locking pawl 181B disengages from bevel pinion 71 and engagement plate 182.
Figure 30C:
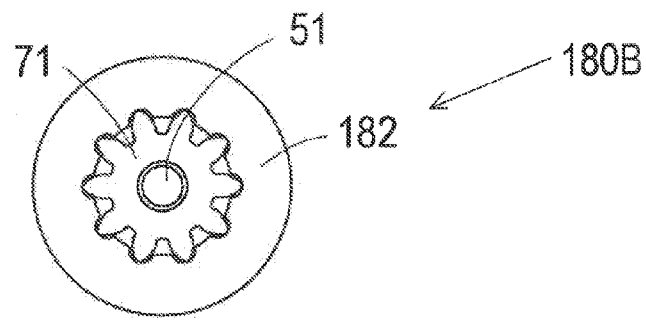
FIG. 30(c) illustrates gear locking system 180B when viewed in the axial direction of motor shaft 51.

Referring to FIGS. 28, 30(a), 30(b), and 30(c), gear locking system 180B is configured to have a locking pawl 181B adapted to engage with bevel pinion 71 via an engagement plate 182. Engagement plate 182 is slidably fitted onto a slant surface of motor swash plate support member 114 so as to be annularly fitted onto a maximum diametric end portion of bevel pinion 71 adjacent to the slant surface of motor swash plate support member 114. In other words, engagement plate 182 serves as a flange fixed on bevel pinion 71. To engage with bevel pinion 71, as shown in FIG. 30(a), locking pawl 181B is rotated forward to be hooked on engagement plate 182 so as to stop engagement plate 182 rotatably integrated with bevel pinion 71. FIG. 30(b) illustrates locking pawl 181B rotated rearward to be separated from engagement plate 182 so as to disengage from bevel pinion 71.

Bevel pinion 71 is disposed at the laterally middle position in transaxle casing 110 so that locking pawl 181 adapted to engage with bevel pinion 71 (directly or via engagement plate 182) is fixed on a laterally middle portion of locking shaft 79 in comparison with locking pawl 80 that is fixed on a rightward or leftward portion of locking shaft 79 so as to correspond to bevel gear 73 disposed rightward or leftward from bevel pinion 71. Therefore, to fasten locking pawl 181 to locking shaft 79, locking shaft 79 has to be provided with only a single fastening means such as a fastener pin hole at the lateral middle portion thereof so as to reduce the number of processes and costs, in comparison with locking shaft 79 for transaxle 1, which is formed with two right and left holes 79a so that one of holes 79a is selected to fasten locking pawl 80 to locking shaft 79 in correspondence to whether bevel gear 73 is disposed rightward or leftward in transaxle casing 10.

Bevel pinion 71 has the engagement portion to engage with locking pawl 181 (directly or via engagement plate 182) at or below the lateral middle bottom end of bevel pinion 71 so that the movement direction of rotating bevel pinion 71 at the engagement portion is substantially laterally horizontal parallel to the axial direction of locking shaft 79 while the rotation direction of locking pawl 181 with locking shaft 79 for engaging with bevel pinion 71 is perpendicular to the axial direction of locking shaft 79. Therefore, an operation force required to rotate locking pawl 181 for engaging with bevel pinion 71 is constant regardless of whether motor shaft 51 rotates clockwise or counterclockwise. On the contrary, if a right or left portion of bevel pinion 71 were adapted to engage with locking pawl 181, the operation force required to rotate locking pawl 181 for engaging with bevel pinion 71 would be changed depending on whether bevel pinion 71 rotates clockwise or counterclockwise because the right or left portion of bevel pinion 71 moves either upward or downward perpendicularly to the axis of locking shaft 79 and parallel to the rotation direction of locking pawl 181 depending on whether bevel pinion 71 rotates clockwise or counterclockwise.

As understood from the above-mentioned features, the setting of relative rotational direction between pump shaft 41 and motor shaft 51 depends on the setting of motor swash plate support member 114 to define the slant angle of fixed swash plate 54 relative to motor shaft 51 or the setting of bevel gear 173 to define whether bevel gear 173 meshes with the right or left side portion of bevel pinion 71. Therefore, the constant operation force for engagement of locking pawl 181 with bevel pinion 71 regardless of the rotational direction of motor shaft 51 relative to pump shaft 41 means that the operation force is constant regardless of the setting of motor swash plate support member 114 or regardless of the setting of bevel gear 173.

Right and left ends of locking shaft 79 project outward from right and left side surfaces of gear top cover 113. Locking arm 78 is selectively fixed on either the right or left end of locking shaft 79. The rotation of locking shaft 79 with locking pawl 181 for engaging with bevel pinion 71 is constant regardless of whether locking arm 78 is fixed on the right or left end of locking shaft 79, thereby meaning that an operation force to be applied to locking arm 78 for rotating locking shaft 79 for the engagement of locking pawl 181 with bevel pinion 71 is constant regardless of whether locking arm 78 is fixed on the right or left end of locking shaft 79.

For example, the rotation direction of locking shaft 79 for engaging locking pawl 181 with bevel pinion 71 corresponds to the depression direction of a brake pedal for forwardly pulling locking arm 78 via a wire or a rod. Therefore, when a pair of transaxles 1A are equipped on a vehicle to serve as right and left transaxles 1R and 1L, both transaxles 1A serving as right and left transaxles 1R and 1L have respective locking arms 78 that are operatively connected to the brake pedal so that both locking arms 78 are pulled forward together by depressing the brake pedal regardless of whether each transaxle 1A has locking arm 78 on the right or left side of transaxle casing 110, regardless of the setting of motor swash plate support member 114 of each transaxle 1A to define the slant angle of fixed swash plate 54 relative to motor shaft 51, or regardless of the setting of bevel gear 173 to define whether bevel gear 173 meshes with the right or left side portion of bevel pinion 71.

Figure 21:
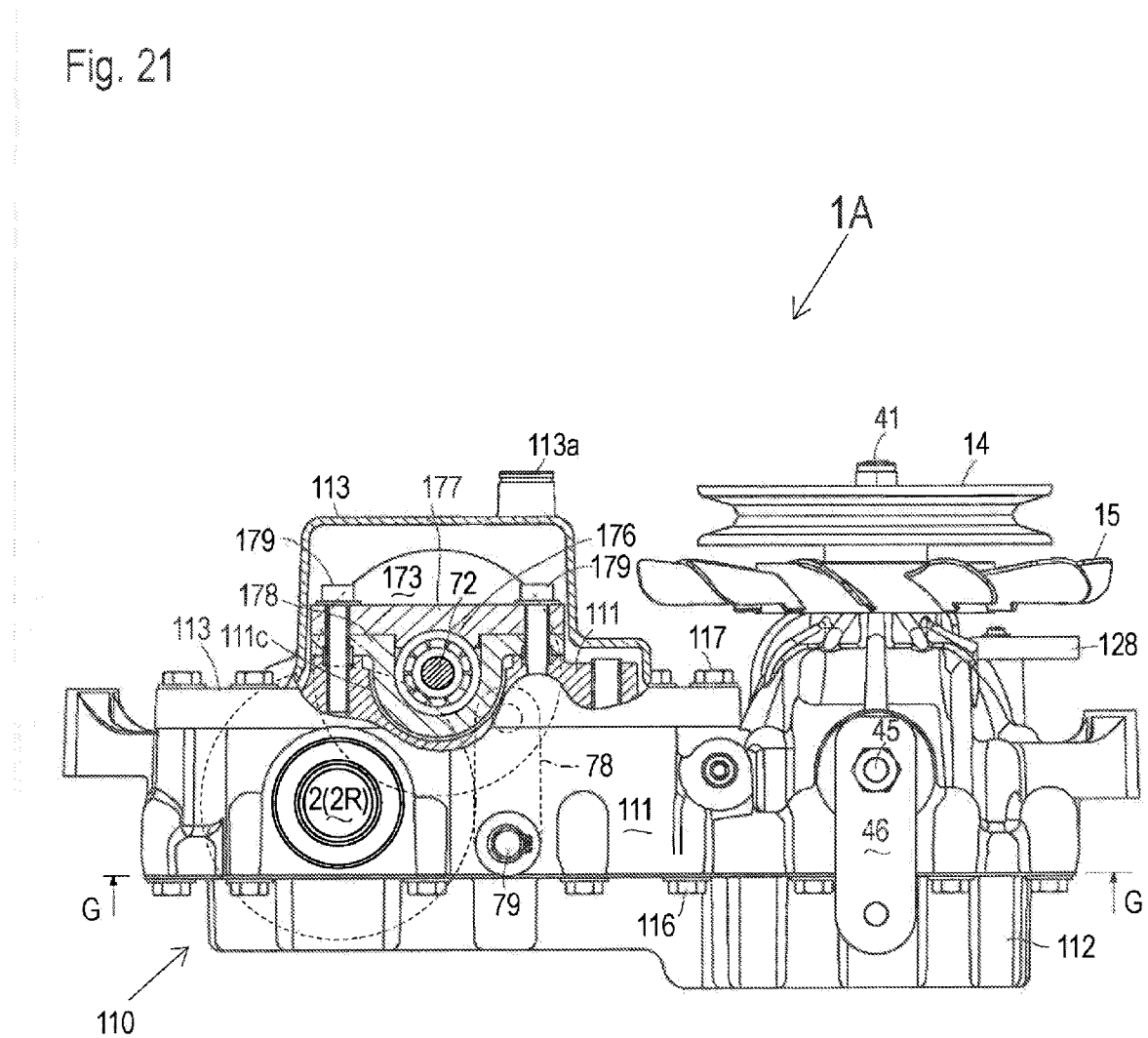
FIG. 21 is a side view of an alternative transaxle 1A serving as right transaxle 1R that represents the pair of right and left transaxles 1R and 1L, including a sectional side view of an upper portion of a reduction gear train 170 taken along N-N arrows of FIG. 28.
Figure 31:
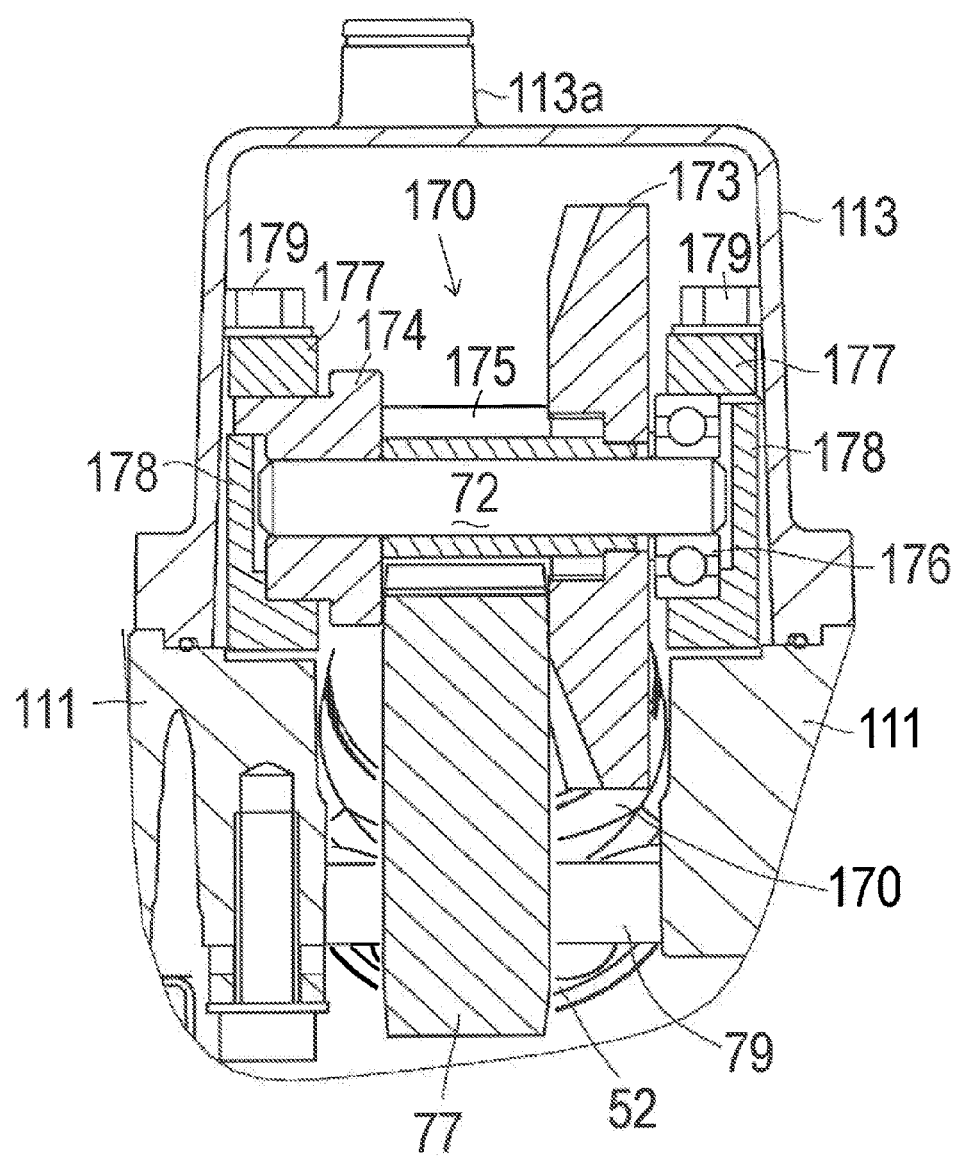
FIG. 31 is a fragmentary sectional rear view of transaxle 1A taken along M-M arrows of FIG. 28, showing a sectional rear view of reduction gear train 170 provided with a bevel gear shaft support structure shown in FIGS. 21 and 28.

Referring to FIGS. 21, 23, and 31, a structure for supporting gear shaft 72 will be described. Gear shaft 72 has a ball bearing 176 on one axial end portion (in this embodiment, a right end portion) thereof adjacent to bevel gear 173 fixed on gear shaft 72, so that ball bearing 176 surely journals gear shaft 72 against the weight of bevel gear 173. On the other hand, gear shaft 72 has a bush 174 on the other axial end portion (in this embodiment, a left end portion) thereof laterally opposite bevel gear 173. Between bush 174 and ball bearing 176, bevel gear 173 is fixed on gear shaft 72 so as to mesh with a right or left (in this embodiment, right) portion of bevel pinion 71, and a pinion 173a is fixed on gear shaft 72 so as to mesh with the upper portion of bull gear 77.

As shown in FIG. 21, upper transaxle housing 111 has edges along right and left bottom edges of gear top cover 113. Each of these edges of upper transaxle housing 111 is formed with front and rear horizontal surfaces and is formed with a downward semicircular recess between the front and rear horizontal surfaces. Right and left bearing covers 178 are disposed along right and left vertical portions of gear top cover 113 so as to cover bush 174 and ball bearing 176 and the axial ends of gear shaft 72, respectively. In this regard, each bearing cover 178 has front and rear horizontal extended portions and a downward semicircular portion between the front and rear horizontal extended portions. The front and rear horizontal extended portions of bearing covers 178 are fitted to the respective front and rear horizontal surfaces of the edges of upper transaxle housing 111, and the downward semicircular portions of bearing covers 178 are fitted to the respective downward semicircular recesses of the edges of upper transaxle housing 111. Right and left horizontal upper bearing covers 177 are extended so as to cover the top ends of bush 174 and ball bearing 176 and are fastened by respective bolts 179 at front and rear portions thereof to upper transaxle housing 111 via the front and rear horizontal extended portions of respective bearing covers 178, thereby journaling the right and left ends of gear shaft 72 with bush 174 and ball bearing 176.

Figure 32:
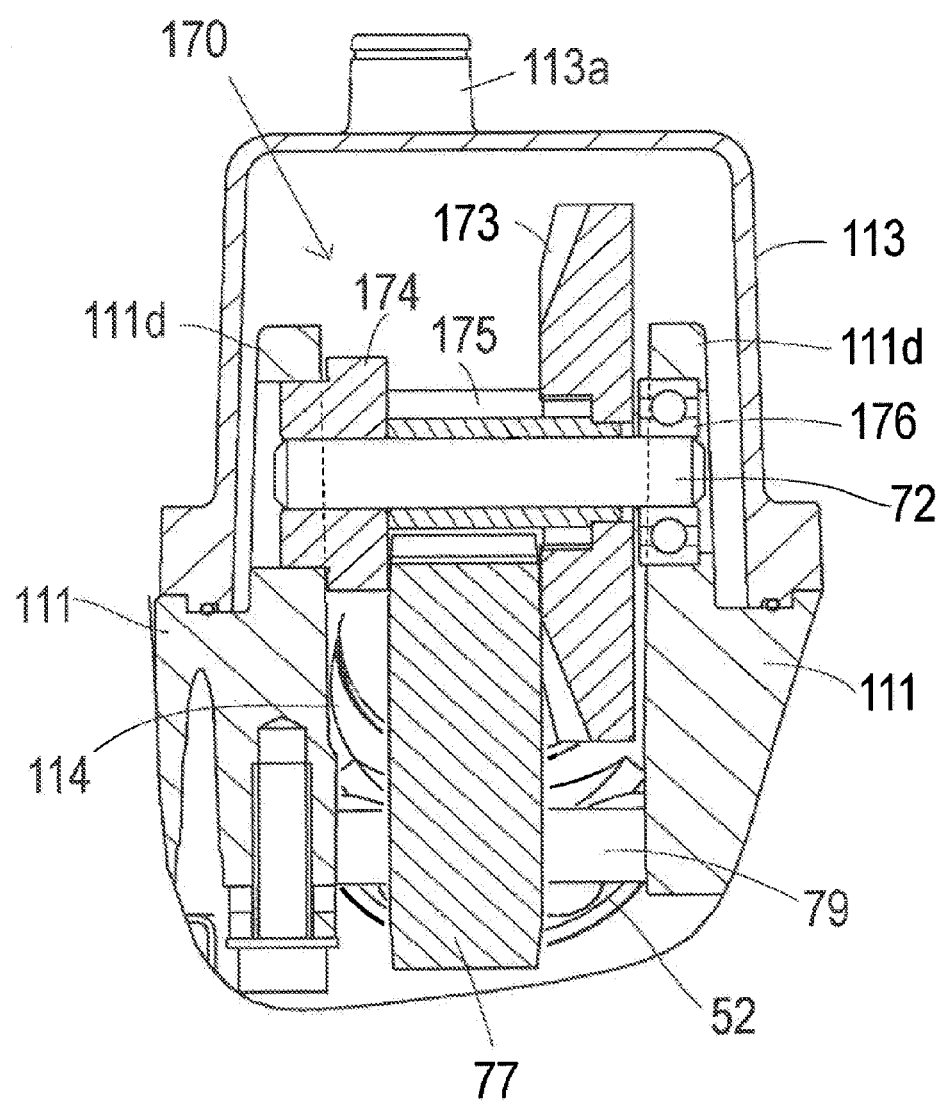
FIG. 32 is a fragmentary sectional rear view of transaxle 1A taken along M-M arrows of FIG. 28, showing a sectional rear view of reduction gear train 170 provided with an alternative bevel gear shaft support structure.

Referring to FIG. 32, an alternative simple structure for supporting gear shaft 72 will be described. Upper transaxle housing 111 is formed at an upper surface thereof integrally with right and left bracket portions 111d extended upright along the right and left vertical portions of gear top cover 113. Bracket portions 111d of upper transaxle housing 111 are formed with respective sectionally circular bearing holes that laterally penetrate respective bracket portions 111d, thereby accommodating bush 174 and ball bearing 175 on the axial end portions of gear shaft 72. Further, to support ball bearing 176 in the corresponding bearing hole of bracket portion 111d, the corresponding bearing hole is formed to have a step for defining the axial position of ball bearing 176.

Such a boring of bearing holes in bracket portions 111d for accommodating bush 174 and ball bearing 176 is advantageous to reduce the number of component parts and to accurately and surely journal bush 174 and ball bearing 176 so as to flexibly respond the diametric and/or axial dimensional errors of bush 174 and ball bearing 176 provided on gear shaft 72, in comparison with the foregoing structure using bearing covers 177 and 178, which increases the number of component parts and which is hard to flexibly correspond to diametric and/or axial dimensional errors of bush 174 and ball bearing 176 on gear shaft 72.

It is further understood by those skilled in the art that the foregoing description is given of preferred embodiments of the disclosed apparatus and that various changes and modifications may be made in the invention without departing from the scope thereof defined by the following claims.

What is claimed is:
1. A transaxle comprising:
a transaxle casing;
a hydrostatic transmission disposed in the transaxle casing; and an axle disposed in the transaxle casing and driven by the hydrostatic transmission, wherein the hydrostatic transmission includes a hydraulic pump and a hydraulic motor fluidly connected to each other, wherein the hydraulic pump has a pump shaft extended perpendicular to the axle, wherein the hydraulic motor is disposed between the hydraulic pump and the axle, wherein the hydraulic motor includes:

a motor shaft drivingly connected to the axle;

plungers reciprocally movable parallel to an axis of the motor shaft; and a fixed swash plate secured by the transaxle casing and abutting against the plungers, and wherein the motor shaft is passed through the fixed swash plate rotatably relative to the fixed swash plate so that the axis of the motor shaft is extended slantwise from an axis of the pump shaft.

2. The transaxle according to claim 1, further comprising:

a gear train for transmitting power from the motor shaft to the axle; and a gear locking system having a locking pawl, wherein a gear of the gear train is adapted to engage with the locking pawl.

3. The transaxle according to claim 2, wherein the gear train includes:

a bevel pinion fixed on the motor shaft; and a bevel gear meshing with the bevel pinion.

4. The transaxle according to claim 3, wherein the bevel pinion serves as the gear adapted to engage with the locking pawl.

5. The transaxle according to claim 1, wherein the axes of the pump shaft and the motor shaft have an acute angle therebetween.

6. The transaxle according to claim 5, wherein the hydrostatic transmission includes:

a center section having a pump mounting surface and a motor mounting surface, wherein the center section is detachably attached to the transaxle casing, wherein respective ports are open at the pump mounting surface and the motor mounting surface so that the hydraulic pump mounted on the pump mounting surface and the hydraulic motor mounted on the motor mounting surface are fluidly connected to each other via the ports, and wherein the pump mounting surface and the motor mounting surface have an obtuse angle therebetween.

7. A transaxle comprising:

a transaxle casing;

a hydrostatic transmission disposed in the transaxle casing;

an axle disposed in the transaxle casing and driven by the hydrostatic transmission;

a gear train for transmitting power from the motor shaft to the axle; and a gear locking system having a locking pawl, wherein the hydrostatic transmission includes a hydraulic pump and a hydraulic motor fluidly connected to each other, wherein the hydraulic pump has a pump shaft extended perpendicular to the axle, wherein the hydraulic motor is disposed between the hydraulic pump and the axle and has a motor shaft drivingly connected to the axle, wherein the motor shaft has an axis extended slantwise from an axis of the pump shaft, wherein the gear train includes a bevel pinion fixed on the motor shaft, and a bevel gear meshing with the bevel pinion, and wherein the gear train includes a gear adapted to engage with the locking pawl.

8. The transaxle according to claim 7, wherein the bevel pinion serves as the gear adapted to engage with the locking pawl.

* * * * *